United States Patent
Tanabiki et al.

(10) Patent No.: US 8,838,409 B2
(45) Date of Patent: Sep. 16, 2014

(54) INSTALLATION ERROR ESTIMATING DEVICE AND INSTALLATION ERROR ESTIMATING METHOD

(75) Inventors: Masamoto Tanabiki, Kanagawa (JP); Takashi Shimojima, Saitama (JP); Makoto Yasugi, Tokyo (JP)

(73) Assignee: Panasonic Corporation, Osaka (JP)

( * ) Notice: Subject to any disclaimer, the term of this patent is extended or adjusted under 35 U.S.C. 154(b) by 537 days.

(21) Appl. No.: 13/126,572

(22) PCT Filed: Nov. 20, 2009

(86) PCT No.: PCT/JP2009/006284
§ 371 (c)(1),
(2), (4) Date: Apr. 28, 2011

(87) PCT Pub. No.: WO2010/061566
PCT Pub. Date: Jun. 3, 2010

(65) Prior Publication Data
US 2011/0208474 A1 Aug. 25, 2011

(30) Foreign Application Priority Data
Nov. 27, 2008 (JP) ................. 2008-302492

(51) Int. Cl.
*G01S 5/00* (2006.01)
*G01S 5/04* (2006.01)
*G01S 7/40* (2006.01)
*G01S 5/02* (2010.01)
*G01S 13/82* (2006.01)
*G06K 7/00* (2006.01)

(52) U.S. Cl.
CPC .............. *G01S 13/82* (2013.01); *G01S 7/4004* (2013.01); *G01S 5/0226* (2013.01); *G06K 7/00* (2013.01)

USPC .............. 702/150; 702/94; 702/181; 700/58; 700/62; 700/64

(58) Field of Classification Search
USPC ......................................... 702/150
See application file for complete search history.

(56) References Cited

U.S. PATENT DOCUMENTS

| 5,068,664 | A | 11/1991 | Appriou et al. |
| 7,339,523 | B2 * | 3/2008 | Bye .............................. 342/451 |

(Continued)

FOREIGN PATENT DOCUMENTS

| JP | 3-154887 | 7/1991 |
| JP | 2002-33611 | 1/2002 |

(Continued)

OTHER PUBLICATIONS

Ken'ichi Mizugaki et al., "22-cm Accurate Location System with 1-cc Small Size Sensor Node: Practical Experiment of UWB Location System", Proceeding of the 2006 IEICE Society Conference, AS-4-5, S-55, Sep. 19, 2006 (Partial translation of related portion).

*Primary Examiner* — Mi'schita' Henson
*Assistant Examiner* — Terence Stifter, Jr.
(74) *Attorney, Agent, or Firm* — Greenblum & Bernstein, P.L.C.

(57) ABSTRACT

An installation error estimating device has a predicted pattern acquirer which obtains a predicted positioning distribution pattern, which is obtained by computing a characteristic pattern of a predicted positioning distribution obtained by predicting a logical positioning distribution, at each observation point where a wireless tag is installed for positioning; and an observation data inputter to which positioning results obtained from the wireless tags by a tag reader are input as observation data. A dispersion pattern analyzer computes a characteristic pattern of a measured positioning distribution, which is obtained by statistical analysis of the applicable positioning result, as a measured positioning distribution pattern at each observation point based on the observation. An installation error estimator computes the installation error for the tag reader using the predicted positioning distribution patterns obtained and the measured positioning distribution patterns computed.

7 Claims, 28 Drawing Sheets

(56) References Cited

U.S. PATENT DOCUMENTS

| | | |
|---|---|---|
| 2005/0130669 A1 | 6/2005 | Mizugaki et al. |
| 2005/0255864 A1* | 11/2005 | Kent et al. ............... 455/456.5 |
| 2007/0040687 A1* | 2/2007 | Reynolds ................. 340/572.7 |
| 2008/0224826 A1 | 9/2008 | Kuwako et al. |
| 2009/0231138 A1* | 9/2009 | Lai et al. ................. 340/572.4 |
| 2009/0267823 A1 | 10/2009 | Konishi et al. |

FOREIGN PATENT DOCUMENTS

| | | |
|---|---|---|
| JP | 2002-318280 | 10/2002 |
| JP | 2005-140617 | 6/2005 |
| JP | 2007-243316 | 9/2007 |
| JP | 2008-122131 | 5/2008 |
| JP | 2008-226093 | 9/2008 |
| WO | 2007/058302 | 5/2007 |

* cited by examiner

FIG.5

OBSERVATION POINT INFORMATION 500

| TAG ID (501) | OBSERVATION POINT COORDINATES (502) | OBSERVATION POINT NAME (503) |
|---|---|---|
| 1 | m/2m, Rz | OBSERVATION POINT 1 |
| 2 | m, m/2 Rz | OBSERVATION POINT 2 |
| 3 | m/2o, Rz | OBSERVATION POINT 3 |
| ... | ... | |

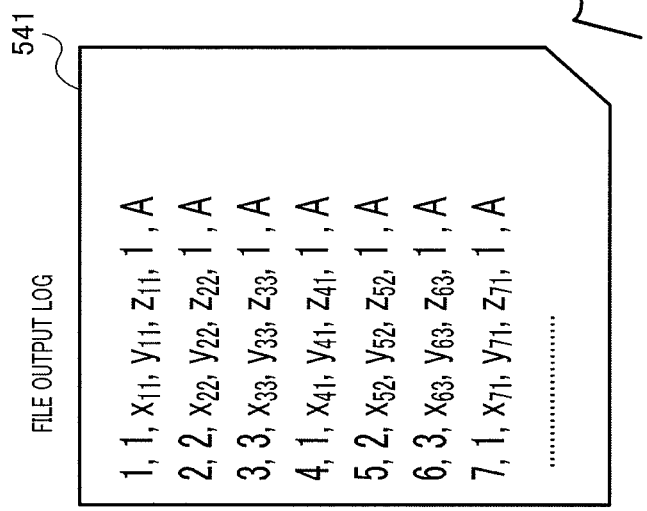
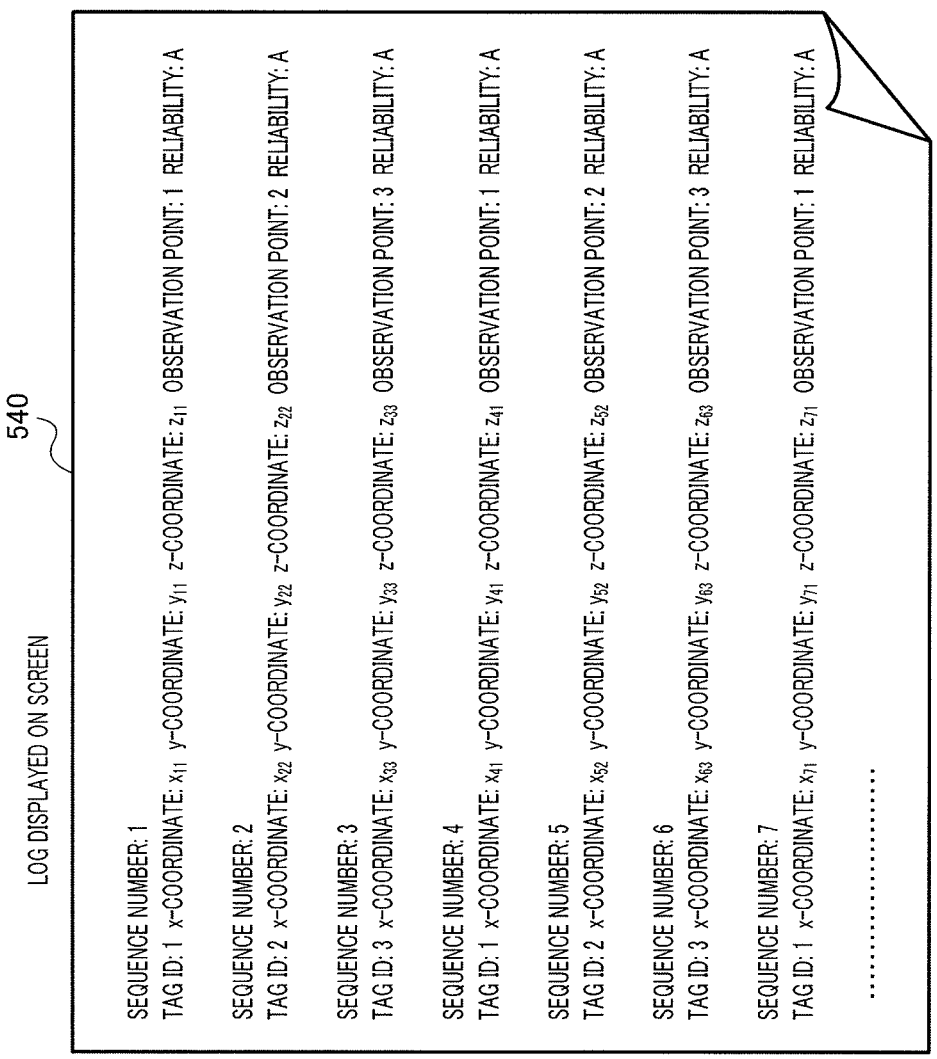
FIG.9A
FIG.9B

MEASURED POSITIONING
DISTRIBUTION PATTERN LIST 560

| TAG ID | AVERAGE | VARIANCE | PATTERN LENGTH |
|---|---|---|---|
| 1 | $\mu_1$ | $\sigma_1$ | $P_1$ |
| 2 | $\mu_2$ | $\sigma_2$ | $P_2$ |
| 3 | $\mu_3$ | $\sigma_3$ | $P_3$ |

FIG.11

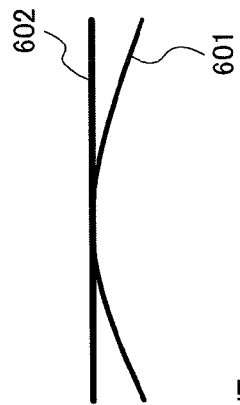
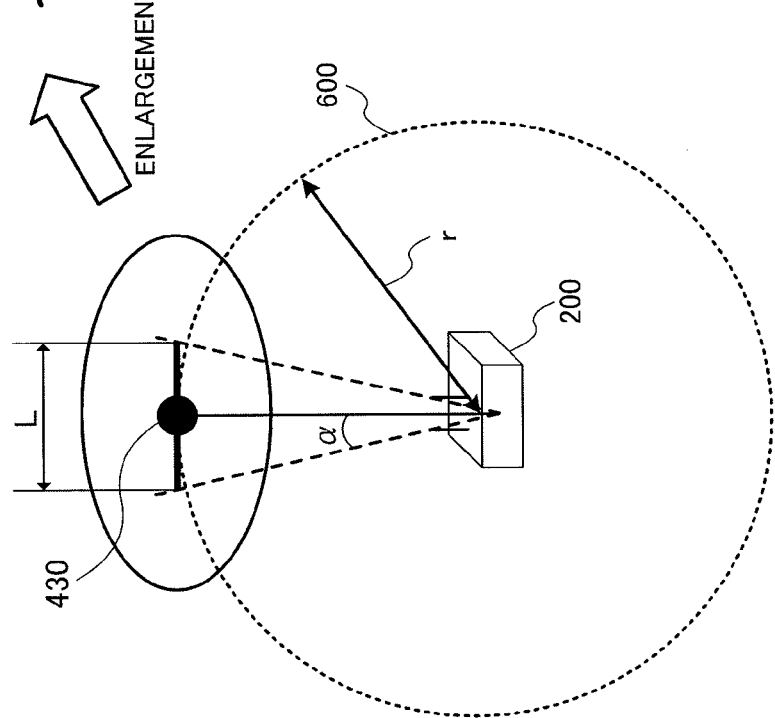
FIG.13B
FIG.13A

FIG.22

730 CONVERGENCE DETERMINATION INFORMATION

731 OBSERVATION DATA INFORMATION

| TAG ID | OBSERVATION POINT NAME | OBSERVATION POINT COORDINATES | AVERAGE RELIABILITY |
|---|---|---|---|
| 1 | OBSERVATION POINT 1 | $(x_1, y_1)$ | A |
| 2 | OBSERVATION POINT 2 | $(x_2, y_2)$ | A |
| 3 | OBSERVATION POINT 3 | $(x_3, y_3)$ | A |
| 4 | OBSERVATION POINT 4 | $(x_4, y_4)$ | A |
| 5 | OBSERVATION POINT 5 | $(x_5, y_5)$ | B |

733 / 734 / 735 / 736

732 MAXIMUM-LIKELIHOOD COMBINATION INFORMATION: OBSERVATION POINT 1, OBSERVATION POINT 2, OBSERVATION POINT 3

FIG.23

ESTIMATION RESULTS LIST 740

| ESTIMATION RESULTS LIST 741 | INSTALLATION ERROR 742<br>(ROTATION DIRECTION θ, X-AXIS DIRECTION a, Y-AXIS DIRECTION b) |
|---|---|
| COMBINATION 1<br>OBSERVATION POINT 1<br>OBSERVATION POINT 2<br>OBSERVATION POINT 3 | ( $\theta_{(1)}$, $a_{(1)}$, $b_{(1)}$ ) |
| COMBINATION 2<br>OBSERVATION POINT 1<br>OBSERVATION POINT 2<br>OBSERVATION POINT 4 | ( $\theta_{(2)}$, $a_{(2)}$, $b_{(2)}$ ) |
| ... | ... |

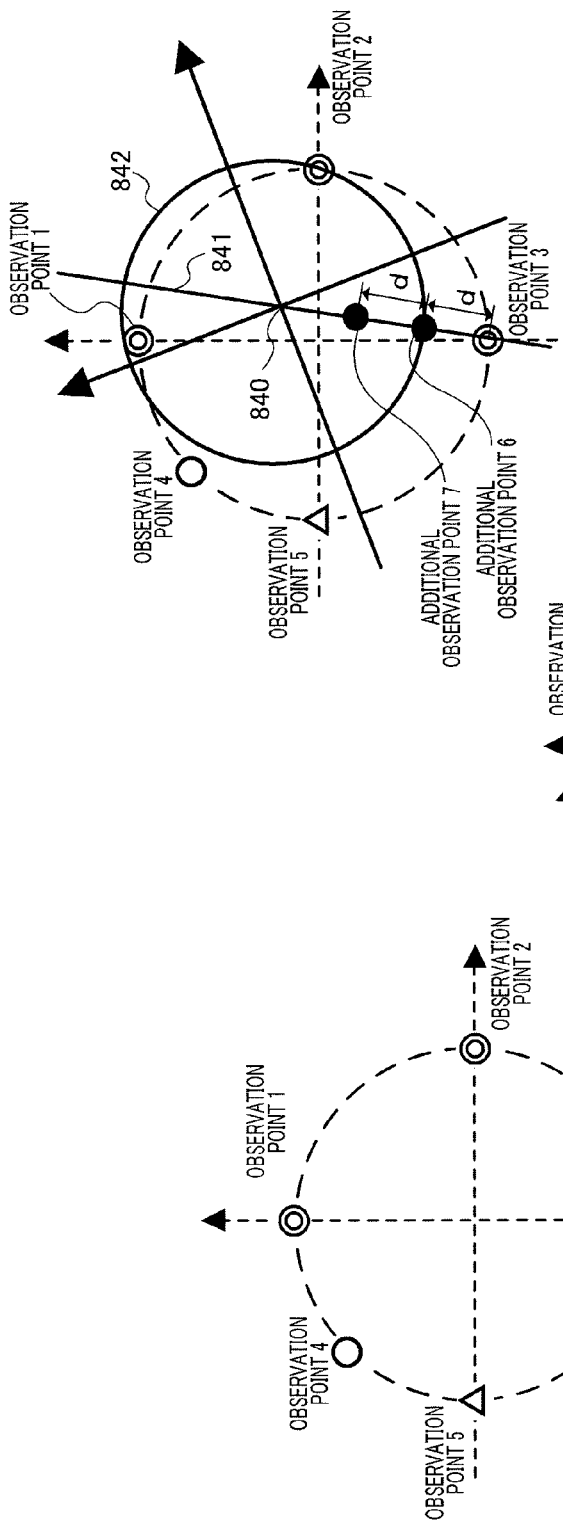
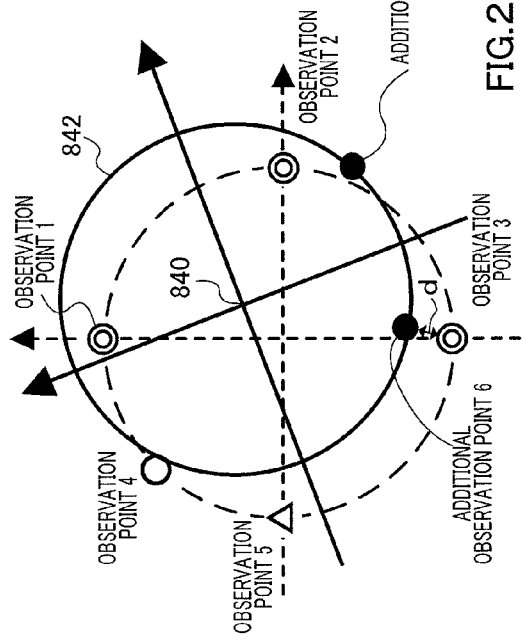

INSTALLATION ERROR ESTIMATING DEVICE AND INSTALLATION ERROR ESTIMATING METHOD

TECHNICAL FIELD

The present invention relates to an installation error estimating apparatus and installation error estimating method for performing installation support for a tag reader that performs radio positioning.

BACKGROUND ART

Although a potential demand for high-precision position management by means of wireless tags has hitherto become evident from the standpoint of distribution and security management and the like, a necessary level of measurement precision has not been attained, and therefore such position management has not become widely established.

However, with the development of UWB (Ultra Wide Band) technology in recent years, the trend of opening-up of frequencies has increased the possibility of making possible radio positioning on the order of several cm to several tens of cm.

For example, in Patent Literature 1, a position measurement method (positioning method) is disclosed whereby a position of a node is measured using a radio communication system having a node (corresponding to a wireless tag) provided with a function for transmitting a positioning signal, and a plurality of base stations (corresponding to tag readers). With this positioning method, at least one of a plurality of base stations transmits a reference signal after receiving a positioning signal. Also, at least two of the plurality of base stations measure a time at which a positioning signal is received, and a time at which a reference signal is received. With this positioning system, the position of a node is calculated using reception times of a positioning signal and reference signal measured by a base station having received the reference signal, and position information of a base station having received the positioning signal.

Also, in Non-Patent Literature 1, an implementation example is disclosed in which UWB is applied to the positioning method disclosed in Patent Literature 1.

CITATION LIST

Patent Literature

PTL 1
Japanese Patent Application Laid-Open No. 2005-140617

Non-Patent Literature

NPL 1
MIZUGAKI Ken'ichi et al, "22-cm Accurate Location System with 1-cc Small Size Sensor Node: Practical Experiment of UWB Location System," 2006 IEICE-ESS Fundamentals Review, pp. S-55

SUMMARY OF INVENTION

Technical Problem

However, in the above conventional positioning method, it is assumed that each base station is correctly installed at a predetermined position, and nothing is disclosed regarding a method of supporting correct installation of a base station at a predetermined position. More particularly, in a high-precision radio positioning system (generally called a "UWB positioning system"), extremely high positioning precision is expected at the same time as extremely high precision is required for base station (tag reader) installation.

In this regard, in wireless tag position detection, when a coordinate system defined by a tag reader and a coordinate system defined by a tag reader installation position and wireless tag movement range are associated, installing a tag reader at a predetermined position with a high degree of precision is time-consuming and expensive. For example, for tag reader installation, there is a method whereby deviation is found by comparing tag reader position and orientation measurement results with a design drawing, plan, or the like, by adding a measuring jig or measuring mark to a tag reader, and repeating deviation correction and measurement. With this kind of installation method, it is possible to achieve installation error convergence by repeating deviation correction and measurement. However, problems with this method are that it is extremely time-consuming and entails high implementation costs.

Furthermore, this method requires a high degree of expertise (special experience, know-how, and so forth) in jig handling and the like for measurement and adjustment that imposes constraints in terms of skill in executing installation and time required for installation.

Thus, a conventional installation method requires special installation structure, parts, and the like for a tag reader, and also requires a high degree of expertise in installation and measurement on the part of installation engineers. Consequently, there is a demand for a method to make possible simple installation that does not entail such requirements, while enabling high-precision positioning to be achieved.

It is therefore an object of the present invention to provide an installation error estimating apparatus and installation error estimating method capable of enabling error-free, high-precision positioning to be achieved with simple installation.

Solution to Problem

An installation error estimating apparatus of the present invention estimates installation error of a tag reader that positions a wireless tag, and has: a predicted pattern acquisition section that acquires a predicted positioning distribution pattern, which is obtained by calculating a characteristic pattern of a predicted positioning distribution obtained by predicting a positioning distribution, for each observation point where the wireless tag is installed and positioned; an observation data input section to which a positioning result of the tag reader with respect to the wireless tag is input as observation data; a variance pattern analysis section that calculates a characteristic pattern of a measured positioning distribution, which is obtained by means of statistical analysis of a positioning result, for each observation point, based on observation data input by means of the observation data input section; and an installation error estimating section that calculates installation error of the tag reader using a predicted positioning distribution pattern acquired by the predicted pattern acquisition section and a measured positioning distribution pattern calculated by the variance pattern analysis section.

An installation error estimating method of the present invention estimates installation error of a tag reader that positions a wireless tag, and has: a predicted pattern acquisition step of acquiring a predicted positioning distribution pattern, which is obtained by calculating a characteristic pattern of a predicted positioning distribution obtained by predicting a positioning distribution, for each observation point where the wireless tag is installed and positioned; an observation data input step of inputting a positioning result of the tag reader with respect to the wireless tag as observation data; a variance pattern analysis step of calculating a characteristic pattern of a measured positioning distribution, which is obtained by means of statistical analysis of a positioning result, for each observation point, based on observation data input by the observation data input step; and an installation error estimating step of calculating installation error of the tag reader using a predicted positioning distribution pattern acquired by the predicted pattern acquisition step and a measured positioning distribution pattern calculated by the variance pattern analysis step.

Advantageous Effects of Invention

The present invention is capable of enabling error-free, high-precision positioning to be achieved with simple installation. That is to say, when a tag reader is installed at a predetermined position and performs high-precision positioning, special installation structure, parts, and the like for the tag reader can be made unnecessary, and simple installation can be made possible that does not require a high degree of expertise in installation and measurement on the part of installation engineers, without sacrificing high-precision of positioning.

BRIEF DESCRIPTION OF DRAWINGS

FIG. 5 is a drawing showing an example of observation point information in this embodiment;
FIG. 9 is a drawing showing examples of log formats in this embodiment;
FIG. 11 is a drawing showing an example of a measured positioning distribution pattern list in this embodiment;
FIG. 13 provides drawings for explaining the concept of a predicted positioning distribution pattern in this embodiment;
FIG. 22 is a drawing showing an example of convergence determination information in this embodiment;
FIG. 23 is a drawing showing an example of an estimation results list in this embodiment;
FIG. 28 provides drawings for explaining the concept of an additional observation point in this embodiment.

DESCRIPTION OF EMBODIMENTS

Now, embodiments of the present invention will be described in detail with reference to the accompanying drawings.

The present invention relates to installation error estimation for estimating tag reader installation error when a user installs a tag reader that performs radio positioning. More particularly, in Embodiment 1, when a user installs a tag reader, a wireless tag is placed peripheral to the tag reader (at an observation point), the position of the wireless tag is measured (observed), and tag reader installation error is estimated based on obtained observation data; in Embodiment 2, when a user installs a tag reader, a wireless tag is placed peripheral to the tag reader (at an observation point), the position of the wireless tag is measured (observed), tag reader installation error is estimated based on obtained observation data, and the estimated installation error is evaluated; and in Embodiment 3, as an addition to Embodiment 2, when tag reader installation error is estimated, a position for newly placing a wireless tag as an observation object is further recommended if the estimated installation error does not satisfy a convergence condition.

The present invention can be applied to installation of various tag readers with different handled wireless tag frequency bands and types (active type or passive type), position detection methods, and so forth. In Embodiments 1 through 3, a method known as single-point positioning that uses a wireless tag utilizing UWB as a communication method (a UWB tag) is described by way of example.

A brief description of single-point positioning is given below.

Single-point positioning is a method whereby, after transmitting a UWB signal, a tag reader measures a delay time of a signal sent back from a wireless tag, and converts the measured delay time to a distance. Furthermore, after transmitting a UWB signal, a tag reader receives a reflected wave reflected by a wireless tag via a plurality of receiving antennas, and decides the direction of a wireless tag from a phase difference of received waves. Then the tag reader estimates (measures) the position of a wireless tag from the distance and wireless tag direction obtained in this way.

Embodiments 1 through 3 will now be described in order.

Embodiment 1

Figure 1:
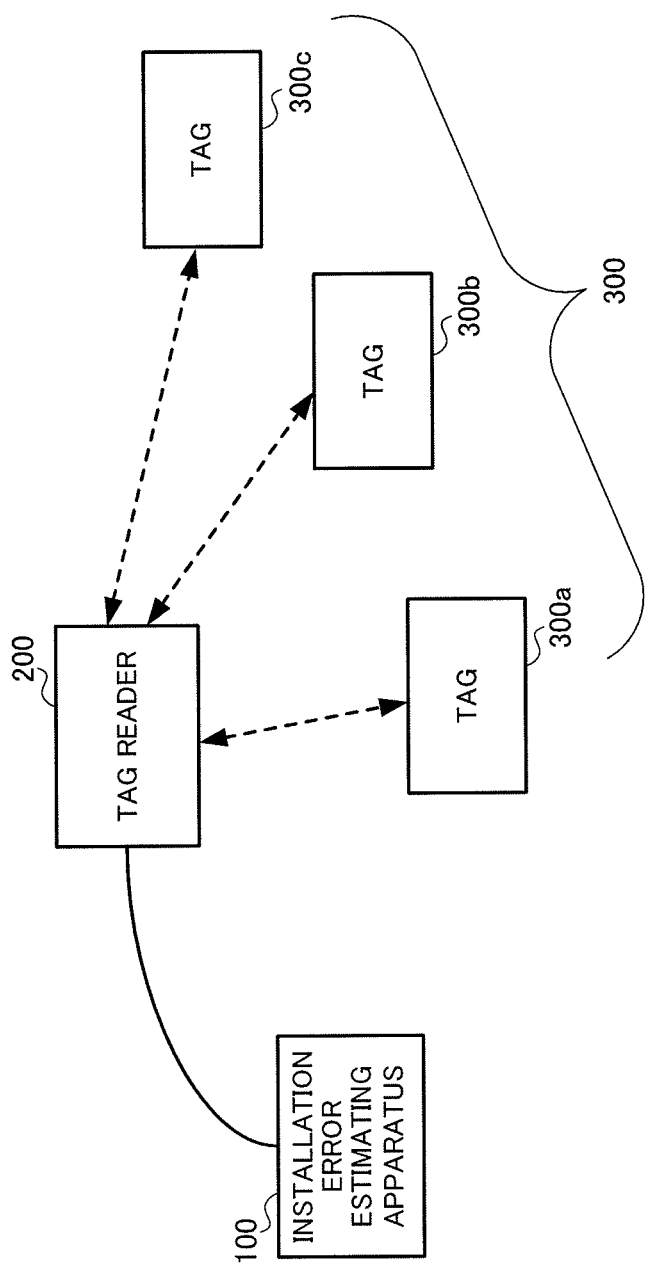
FIG. 1 is a configuration diagram of a UWB positioning system that includes an installation error estimating apparatus according to Embodiment 1 of the present invention.

FIG. 1 is a configuration diagram of a UWB positioning system that includes an installation error estimating apparatus according to Embodiment 1 of the present invention.

The system shown in FIG. 1 has installation error estimating apparatus 100, tag reader 200, and wireless tags 300. In FIG. 1, three wireless tags 300a, 300b, and 300c are shown as wireless tags 300. Installation error estimating apparatus 100 estimates the installation position of tag reader 200. The configuration and operation of installation error estimating apparatus 100 will be described in detail later herein. Tag reader 200 performs position detection for wireless tags 300 by means of single-point positioning. Wireless tags 300 are UWB tags, for example.

For example, a UWB positioning system sequentially detects wireless tag 300 positions by having wireless tags 300 attached to a person or object and performing radio communication with tag reader 200. Consequently, a UWB positioning system can be applied to management of the entry and exit of people in an office, management of the location of medical supplies in a hospital, work efficiency improvement by ascertaining flow lines in a factory, and so forth.

Tag reader 200 and wireless tags 300 perform communication by means of radio (UWB). Installation error estimating apparatus 100 and tag reader 200 perform data exchange by means of communication via an IP (Internet Protocol) network, for example.

Figure 2:
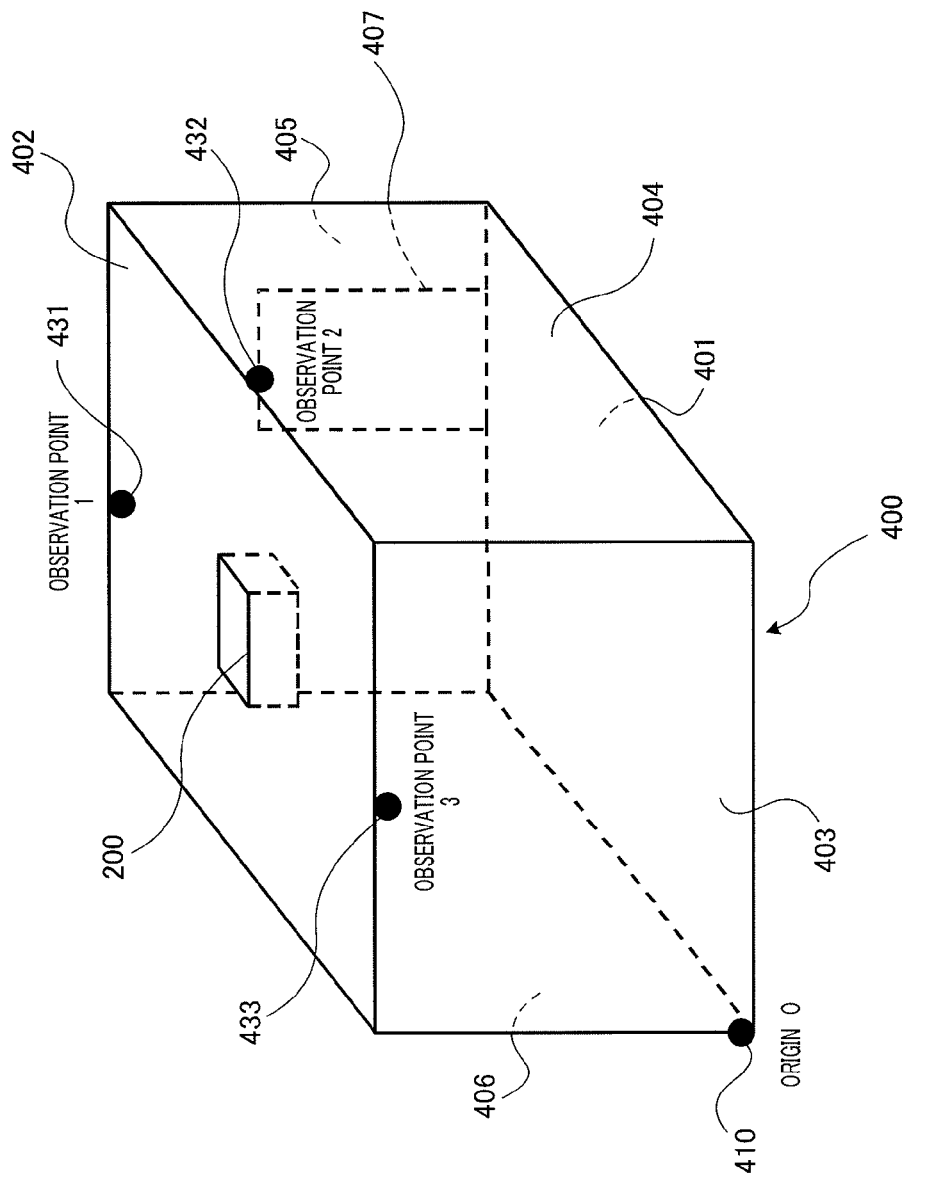
FIG. 2 is a schematic diagram showing an example of a positioning target area in this embodiment.
Figure 3:
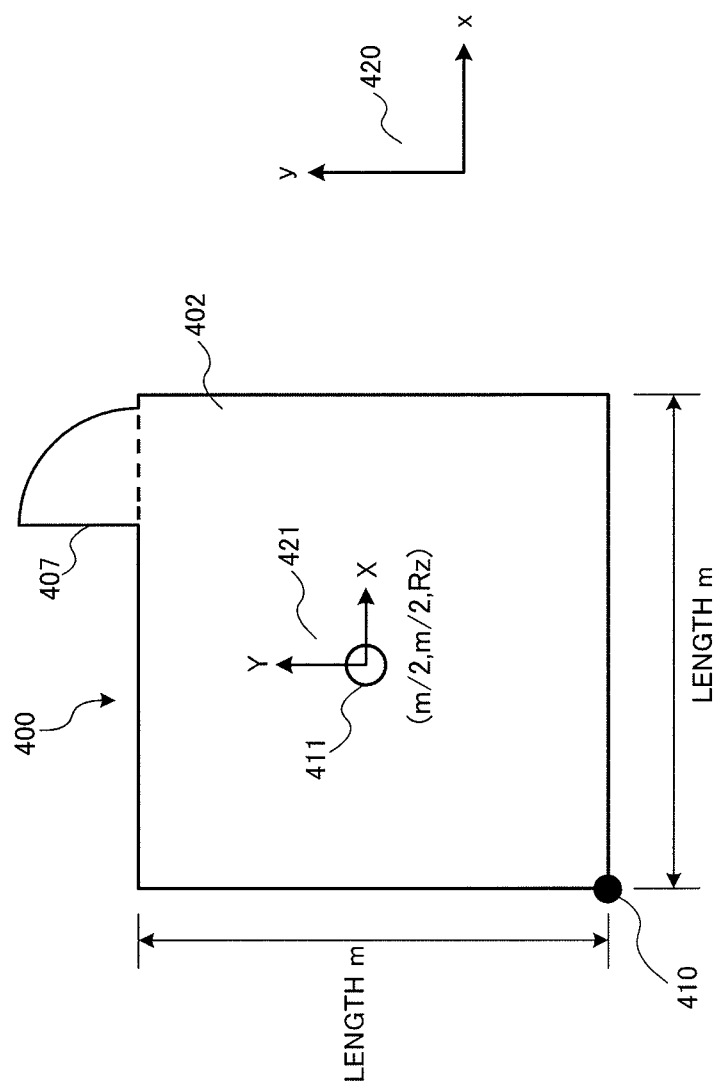
FIG. 3 is a plan of the positioning target area shown in FIG. 2.

FIG. 2 is a schematic diagram showing an example of a positioning target area in this embodiment, and FIG. 3 is a plan of the positioning target area shown in FIG. 2. Here, a positioning target area is a spatial area in which tag reader 200 is installed and performs wireless tag 300 position detection.

As shown in FIG. 2, positioning target area 400 in this embodiment is a rectangular parallelepiped in shape, being a simple room comprising floor 401, ceiling 402, four walls 403 through 406, and door 407.

FIG. 3 is a bird's-eye view of the room, looking from ceiling to floor. As shown in FIG. 3, the bottom-left corner of the room is designated origin (0, 0, 0) 410. Positioning target area 400 has length m assigned to it in the x-axis direction, length m in the y-axis direction, and height h (not shown) in the z-axis direction (in the direction toward the viewer from the surface of the drawing). This coordinate system (xyz) 420 is a global coordinate system described later herein.

Also, as shown in FIG. 3, tag reader 200 is installed at installation position 411 in the center (m/2, m/2, Rz) of ceiling 402. Internally held coordinate system 421 (this coordinate system (XYZ) being a local coordinate system described later herein) used in positioning is defined in tag reader 200. Therefore, tag reader 200 is expected to be installed with an orientation such that the X-axis of local coordinate system 421 and the x-axis of global coordinate system 420 coincide, and the Y-axis of local coordinate system 421 and the y-axis of global coordinate system 420 coincide.

Consequently, in position detection of wireless tag 300, it is necessary to make a coordinate system defined by tag reader 200 and a coordinate system whereby a tag reader 200 installation position and a wireless tag 300 movement range are defined associated. For example, a coordinate system whereby a tag reader 200 installation position and a wireless tag 300 movement range are defined is a coordinate system having a certain point in an office, factory, or the like as a reference point (hereinafter referred to as "global coordinate system"), as in a design drawing, plan, or the like. On the other hand, a coordinate system defined by tag reader 200 is a coordinate system having a certain point of tag reader 200 as a reference point (hereinafter referred to as "local coordinate system"). In this embodiment, as indicated above, a wireless tag 300 position is represented by (x, y, z) in global coordinate system 420, and is represented by (X, Y, Z) in local coordinate system 421. Hereinafter, coordinates (x, y, z) in a global coordinate system are called "global coordinates," and coordinates (X, Y, Z) in a local coordinate system are called "local coordinates."

If tag reader 200 is installed without error in the proper position and orientation in a design drawing, global coordinate system 420 and local coordinate system 421 can be made to coincide perfectly as shown in equation 1 below. In this case, a wireless tag 300 position measured in local coordinate system 421 by tag reader 200 can be represented in global coordinate system 420.

[1]

$$\begin{pmatrix} x \\ y \\ z \end{pmatrix} = \begin{pmatrix} X \\ Y \\ Z \end{pmatrix} + \begin{pmatrix} a_1 \\ a_2 \\ a_3 \end{pmatrix} \quad \text{(Equation 1)}$$

Here, $(a_1, a_2, a_3)$ is known information in a design drawing as a difference between origin 410 in global coordinate system 420 and position 411 at which tag reader 200 should be installed, and comprises fixed values.

Figure 4:
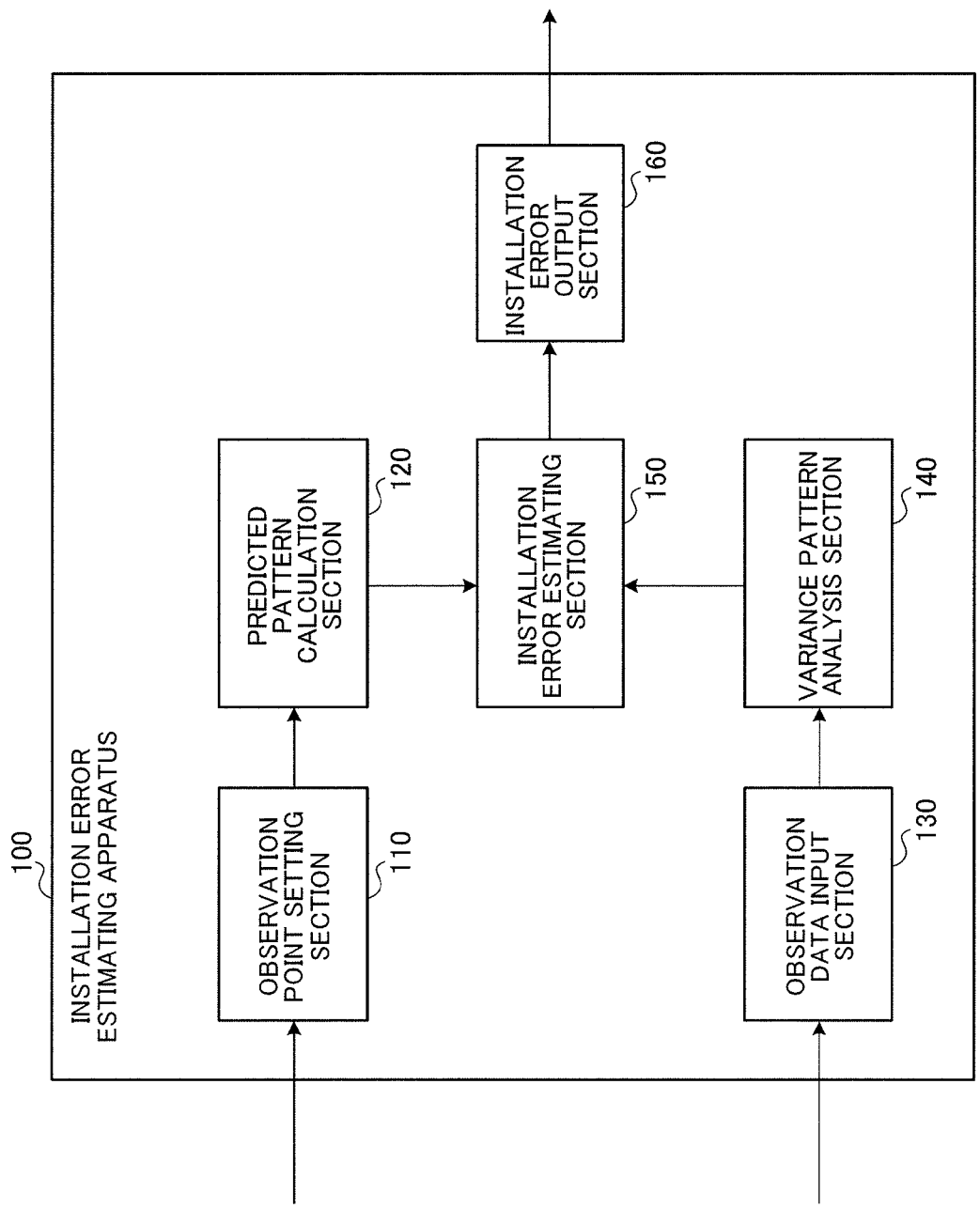
FIG. 4 is a block diagram showing the configuration of an installation error estimating apparatus according to this embodiment.

FIG. 4 is a block diagram showing the configuration of installation error estimating apparatus 100 according to this embodiment.

Installation error estimating apparatus 100 shown in FIG. 4 has observation point setting section 110, predicted pattern calculation section 120, observation data input section 130, variance pattern analysis section 140, installation error estimating section 150, and installation error output section 160.

Installation error estimating apparatus 100 comprises, for example, a computer system (personal computer, workstation, or the like) having a communication function. Although not shown in the drawing, this computer system broadly comprises an input apparatus, computer main unit, output apparatus, and communication apparatus. The input apparatus is a keyboard, mouse, or the like, for example. The output apparatus is a display, printer, or the like, for example. The communication apparatus is a communication interface capable of connecting with an IP network or the like, for example. The computer main unit mainly comprises a CPU (Central Processing Unit) and storage apparatus, for example. The CPU has a control function and computation function. The storage apparatus has, for example, ROM that stores a program and data, and RAM that stores data temporarily. The ROM may be flash memory whose contents can be electrically rewritten.

The configuration (including input and output) of sections 110 through 160 making up installation error estimating apparatus 100 will now be described, followed by a description of the operation (internal processing) of installation error estimating apparatus 100.

Observation point setting section 110 sets information relating to an observation point at which wireless tag 300 is installed and positioned as observation point information—that is, stores a user observation point specification result.

Specifically, observation point setting section 110 stores observation point information input by a user using an input apparatus (not shown) in a predetermined format.

Observation point information includes a wireless tag 300 identifier (hereinafter referred to as "tag ID"), coordinates (x, y, z) of an observation point at which wireless tag 300 is placed (hereinafter referred to as "observation point coordinates"), and a name of an observation point at which wireless tag 300 is placed (hereinafter referred to as "observation point name").

FIG. 5 is a drawing showing an example of observation point information.

As shown in FIG. 5, tag ID 501, observation point coordinates 502, and observation point name 503 are stored in observation point information 500 in a mutually associated fashion.

When installation error estimating apparatus 100 is started by a user, observation point setting section 110 displays an operation screen for setting observation point information.

Figure 6:
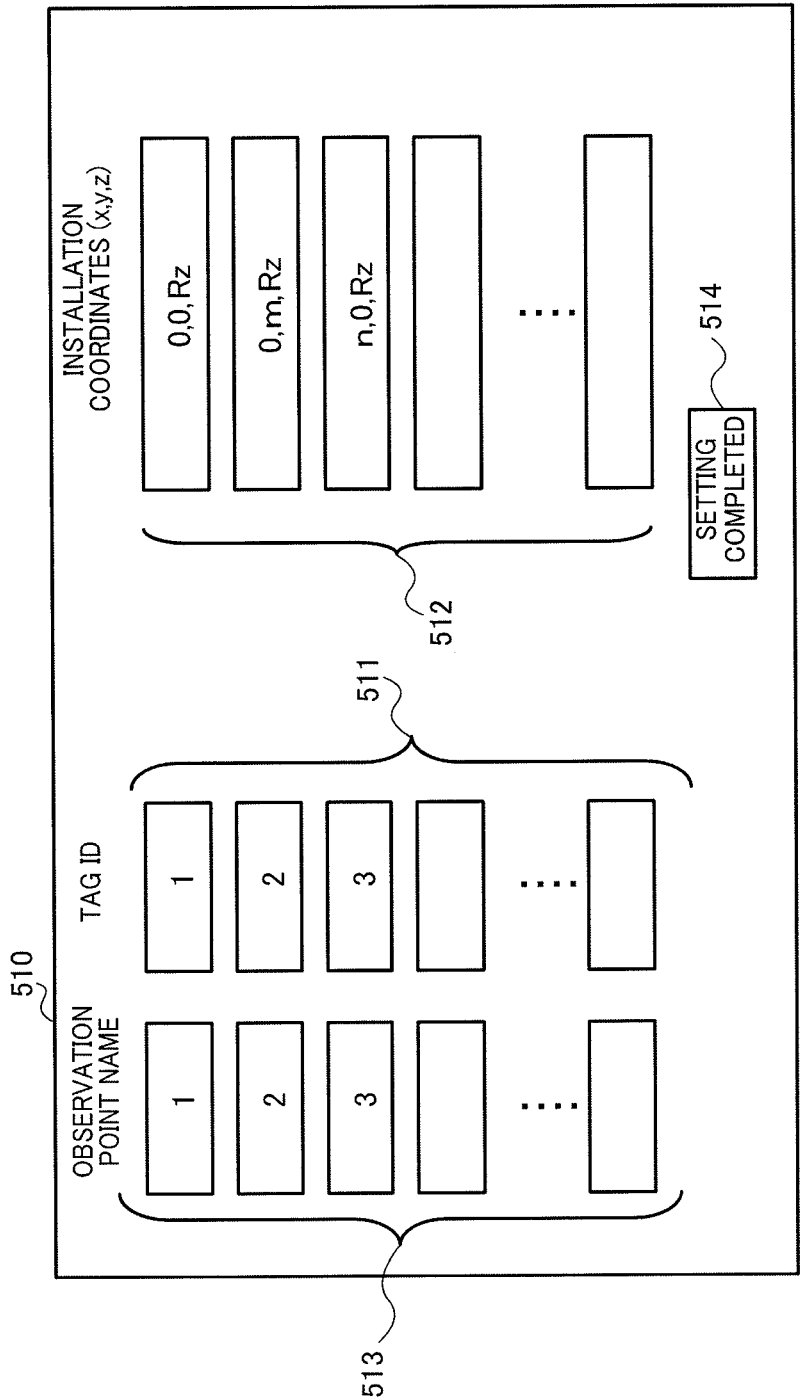
FIG. 6 is a drawing showing an example of an operation screen display for setting observation point information in this embodiment.

FIG. 6 is a drawing showing an example of an operation screen display for setting observation point information.

Operation screen 510 (hereinafter also referred to as "screen 1") shown in FIG. 6 is provided with tag ID input column 511, observation point coordinate input column 512, and observation point name input column 513, according to observation point information 500 items. Operation screen 510 is displayed until setting completed button 514 is pressed.

Predicted pattern calculation section 120 calculates a characteristic pattern of a predicted positioning distribution obtained by predicting a theoretical positioning distribution for each observation point as a predicted positioning distribution pattern, based on observation point information set by observation point setting section 110. Specifically, predicted pattern calculation section 120 acquires observation point information 500 (tag ID 501, observation point coordinates 502, and observation point name 503) from observation point setting section 110. Then predicted pattern calculation section 120 predicts a positioning distribution (theoretical values) for observation point coordinates 502, and creates predicted positioning distribution pattern L described later herein. For example, assume that for tag reader 200 installation error, orientation (rotation direction) deviation is designated θ, x-axis direction position deviation is designated a, and y-axis direction position deviation is designated b. At this time, predicted positioning distribution pattern L for each observation point can be represented as function f in equation 2 below, using an affine transformation of a wireless tag 300 theoretical positioning distribution characteristic. The function f derivation method—that is, the predicted positioning distribution pattern creation method used by predicted pattern calculation section 120—will be described later herein.

[2]

$$L = f(\theta, a, b)$$ (Equation 2)

In this embodiment, it has been assumed that observation point setting section 110 and predicted pattern calculation section 120 are provided, and a predicted positioning distribution pattern is calculated each time a user inputs observation point information, but the present invention is not limited to this. For example, it is possible for a predicted positioning distribution pattern to be calculated beforehand for each observation point, and to be held inside or outside installation error estimating apparatus 100, associated with observation point information. The predicted positioning distribution pattern holding means may be a storage apparatus incorporated in installation error estimating apparatus 100, an external storage apparatus connected to installation error estimating apparatus 100, or any of various kinds of apparatus in a network capable of communication with installation error estimating apparatus 100.

Observation data input section 130 has tag reader 200 observation results for wireless tags 300 as input as observation data—that is, stores tag reader 200's wireless tag 300 observation results. Specifically, observation data input section 130 receives from 200, and stores, observation data obtained by tag reader 200 by performing positioning a plurality of times (for example, 100 times) for each wireless tag 300. The observation data may be received from tag reader 200 in real time, or may be received together after observation ends (after observation has been performed a plurality of times for each wireless tag 300). In this embodiment, a case in which observation data is received in real time is described as an example.

Figure 7:
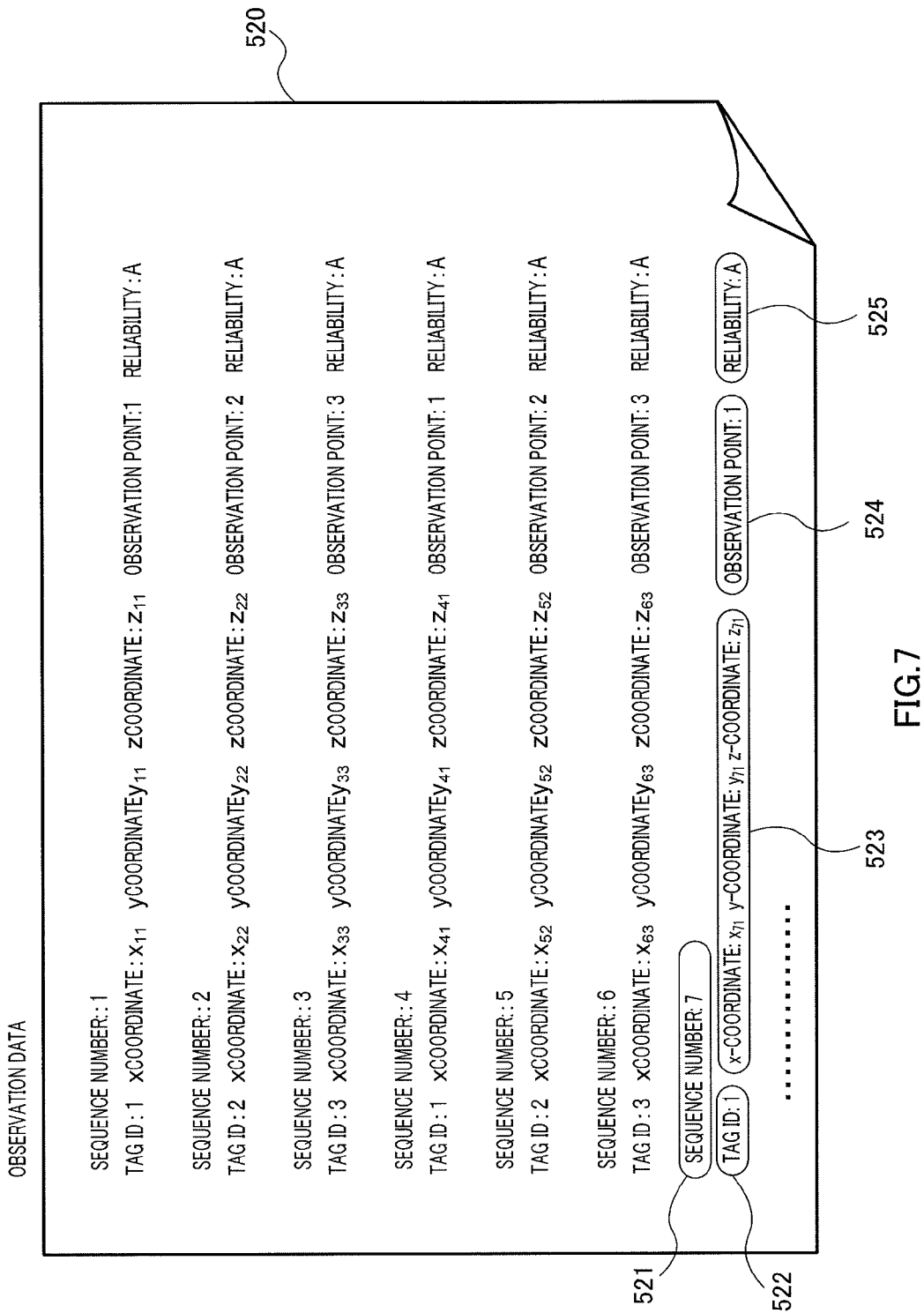
FIG. 7 is a drawing showing an example of observation data in this embodiment.

FIG. 7 is a drawing showing an example of observation data.

Observation data 520 shown in FIG. 7 includes, as data types (items), sequence number 521, tag ID 522, positioning position coordinates (positioning result) 523 of positioned wireless tag 300, observation point name 524, and positioning reliability 525. Positioning position coordinates 523 of wireless tag 300 are identified by at least one of tag ID 522 and observation point name 524. Positioning reliability 525 is assigned a high rank, for example, if communication conditions are determined to be good. In this embodiment, it is assumed that all wireless tags 300 are installed in places in clear view, and therefore communication conditions are good and the highest rank of "A" is assigned to each measurement.

Observation data input section 130 displays an operation screen for starting and terminating positioning.

Figure 8:
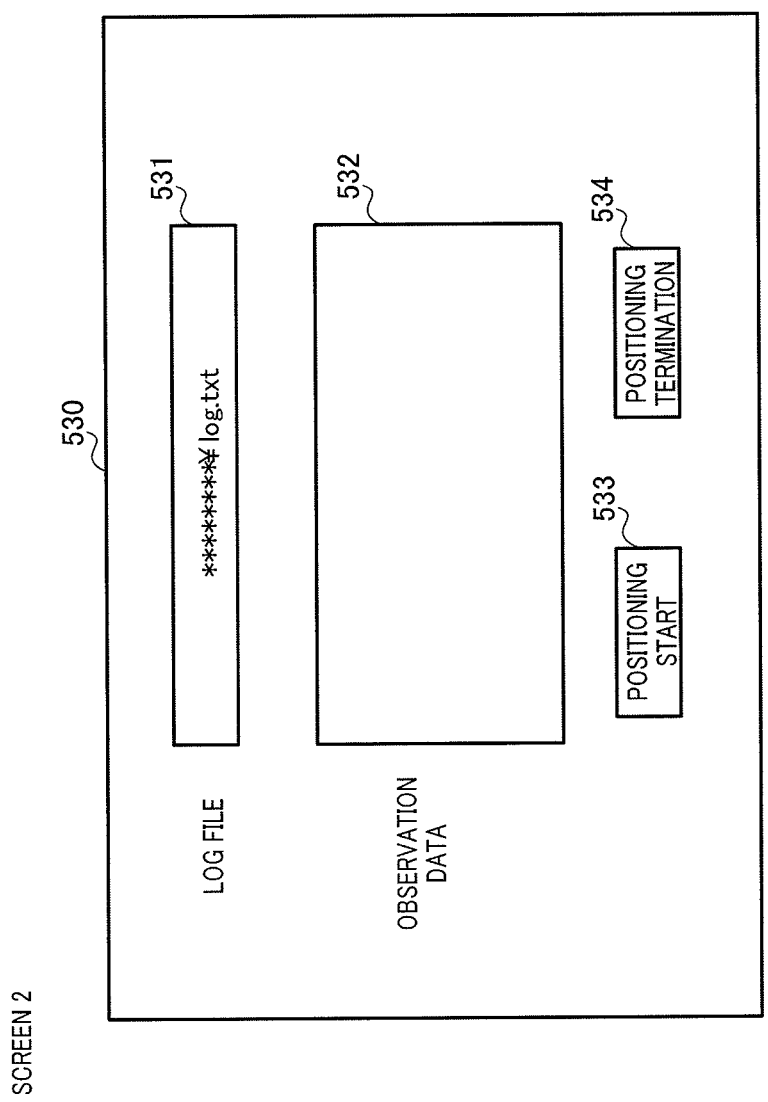
FIG. 8 is a drawing showing an example of an operation screen display for starting and terminating positioning in this embodiment.

FIG. 8 is a drawing showing an example of an operation screen display for starting and terminating positioning.

Operation screen 530 (hereinafter also referred to as "screen 2") shown in FIG. 8 is provided with log file input field 531, observation data display field 532, positioning start button 533, and Positioning Termination button 534.

In an observation data 520 positioning start, when a user inputs a filename in log file input field 531 and presses positioning start button 533, a "start positioning" command is passed to tag reader 200, and tag reader 200 starts wireless tag 300 positioning. On receiving observation data 520 from tag reader 200, observation data input section 130 sequentially displays data included in received observation data 520 in observation data display field 532, and also writes a positioning result to the file specified by the user.

FIG. 9 is a drawing showing examples of log formats. More particularly, FIG. 9A shows an example of a log file displayed in observation data display field 532, and FIG. 9B shows an example of a file output log.

As shown in FIG. 9A, in log 540 displayed in observation data display field 532, a sequence number, tag ID, x-coordinate, y-coordinate, and z-coordinate of the tag identified by the tag ID, observation point name, and estimated reliability, are displayed sequentially. Display of log 540 is omitted in order from a past log (data with a small sequence number) due to screen size limitations.

As shown in FIG. 9B, in file output log 541, the same kind of data as in log 540 displayed on the screen is added sequentially to a file from left to right, delimited by commas, without an item name.

Wireless tag 300 positioning is terminated automatically when a predetermined number of measurements (for example, 100 measurements per wireless tag) has been reached, or is forcibly terminated by depression of Positioning Termination button 534 by the user. In this embodiment, the number of measurements is set as 100 per wireless tag, for example. Therefore, for example, when three wireless tags 300 are positioned, positioning is terminated automatically when the sequence number reaches 300. Although not shown in the drawings, a button or input field relating to setting of the number of measurements may be added to operation screen 530.

Variance pattern analysis section 140 calculates a characteristic pattern of a measured positioning distribution, which is obtained by means of statistical analysis of positioning results, for each observation point, based on observation data input by means of observation data input section 130. Specifically, variance pattern analysis section 140 receives observation data 520 from observation data input section 130, and performs statistical analysis of a positioning distribution (measured values) for each wireless tag 300 identified by tag ID 522. Then variance pattern analysis section 140 passes an obtained measured positioning distribution characteristic pattern (measured positioning distribution pattern) to installation error estimating section 150 as "variance pattern S."

Figure 10:
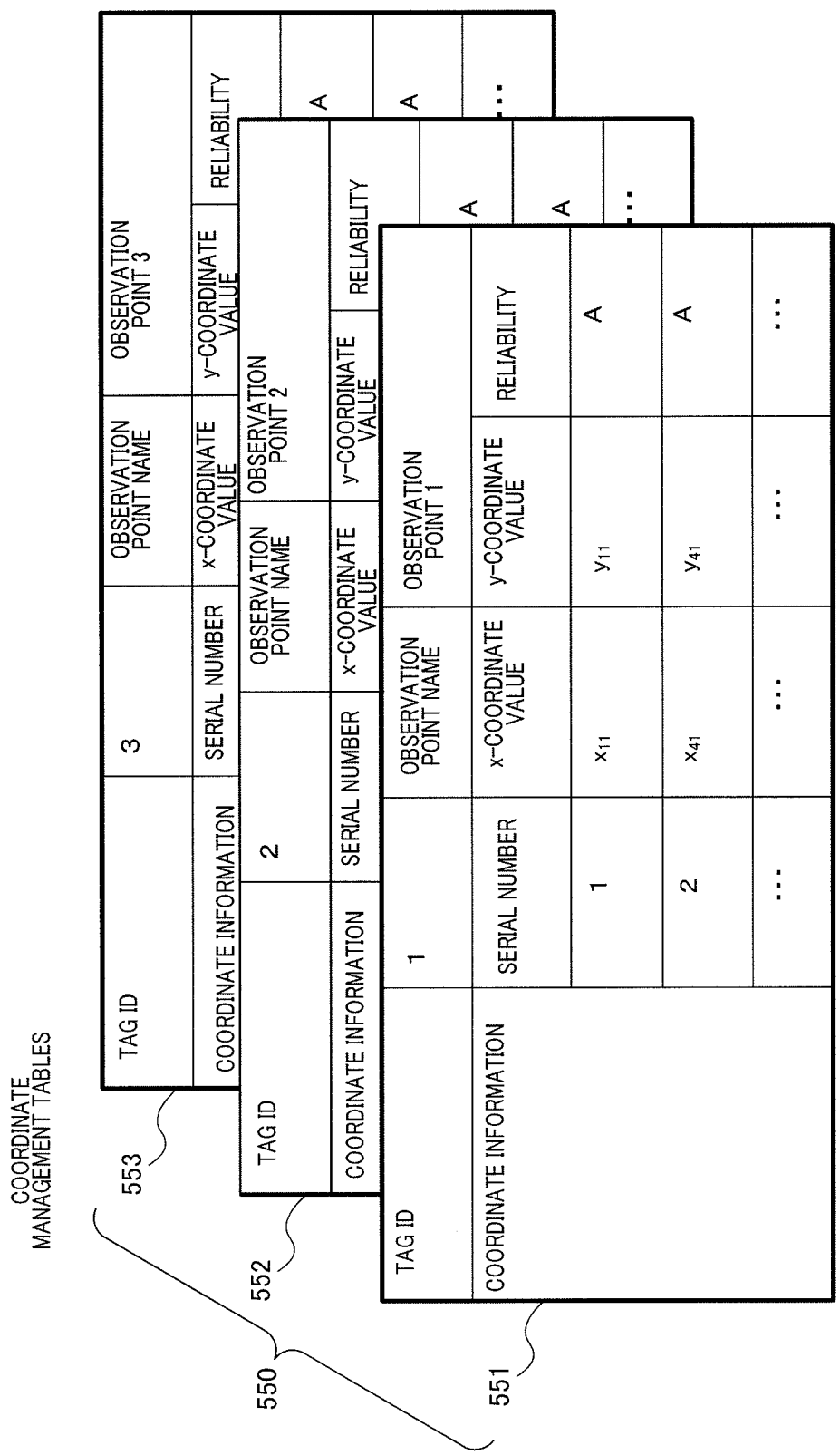
FIG. 10 is a drawing showing an example of coordinate management tables in this embodiment.

More specifically, on receiving observation data 520 (log file 541) from observation data input section 130, variance pattern analysis section 140 creates coordinate management tables 550 shown in FIG. 10, for example. Coordinate management tables 550 comprise a tag ID, an observation point name, and coordinate information. Coordinate information comprises a serial number, x-coordinate value, y-coordinate value, and reliability. In FIG. 10, coordinate management table 551 is a coordinate management table in which the tag ID is managed as "1" and the observation point name as "1." Similarly, coordinate management table 552 is a coordinate management table in which the tag ID is managed as "2" and the observation point name as "2," and coordinate management table 553 is a coordinate management table in which the tag ID is managed as "3" and the observation point name as "3." In this embodiment, for convenience of explanation, z-axis direction coordinates are the same for tag reader 200 and wireless tags 300 and are not required in the processing described later herein, and are therefore omitted.

Variance pattern analysis section 140 creates measured positioning distribution pattern list 560 shown in FIG. 11, for example. Measured positioning distribution pattern list 560 records results of measured positioning distribution pattern analysis. As shown in FIG. 11, measured positioning distribution pattern list 560 comprises, for example, a tag ID, observation result x-coordinate or y-coordinate average value μ and variance σ, and pattern length P based on a computational formula described later herein. The actual analytical method used by variance pattern analysis section 140 will be described in detail later herein.

Installation error estimating section 150 calculates installation error of tag reader 200 using a predicted positioning distribution pattern calculated by predicted pattern calculation section 120 and variance pattern S calculated by variance pattern analysis section 140 based on observation data 520.

Specifically, installation error estimating section 150 receives predicted positioning distribution pattern L represented by equation 2 from predicted pattern calculation section 120, and variance pattern S from variance pattern analysis section 140, for each observation point at which wireless tag 300 is placed. Then, using transmitted predicted positioning distribution pattern L and variance pattern S, installation error estimating section 150 solves equation 3 below so that predicted positioning distribution pattern L becomes a good approximation of variance pattern S at each observation point. By this means, installation error estimating section 150 estimates θ, a, and b comprising tag reader 200 installation error. Installation error estimating section 150 passes estimated installation error (θ, a, b) to installation error output section 160. The actual processing performed by installation error estimating section 150 will be described in detail later herein.

[3]

$$f(\theta, a, b) = S \quad \text{(Equation 3)}$$

Estimating the three variables θ, a, and b using equation 3 requires at least variance patterns $S_1$, $S_2$, and $S_3$ relating to three observation points. Thus, in this embodiment, three observation points 431, 432, and 433 (observation point 1, observation point 2, and observation point 3, respectively) are provided, as shown in FIG. 2.

Installation error output section 160 reports installation error (θ, a, b) estimated by installation error estimating section 150 to the user via a predetermined operation screen.

Figure 12:
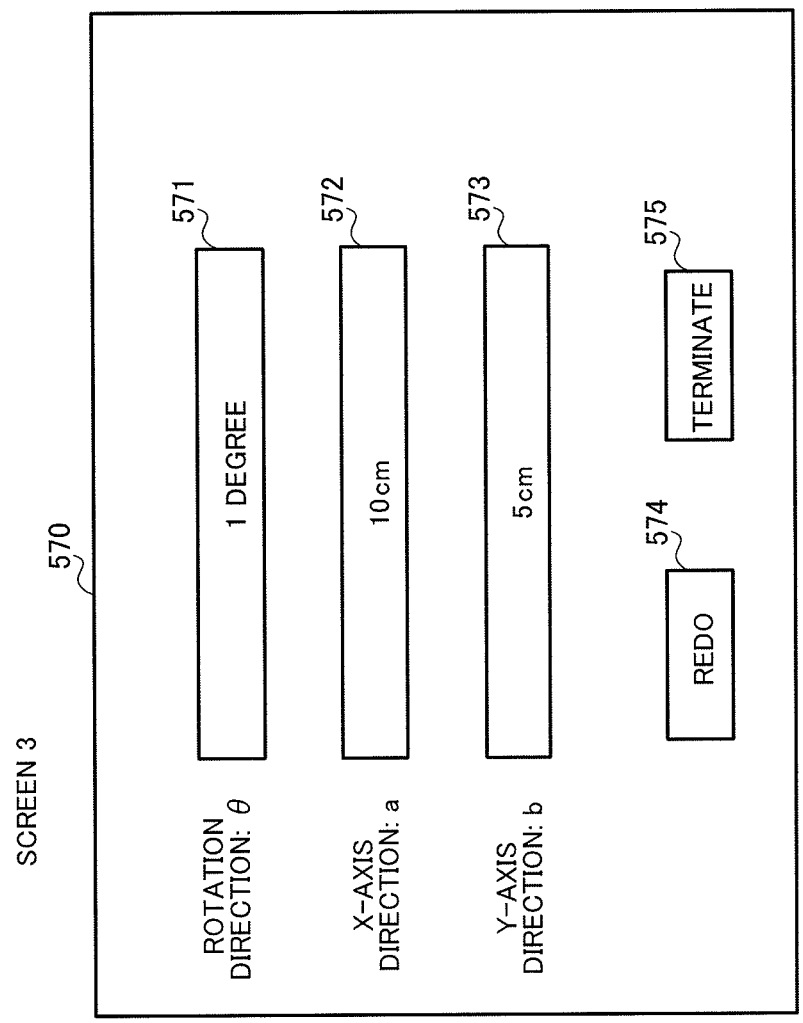
FIG. 12 is a drawing showing an example of an operation screen display for displaying estimated installation error in this embodiment.

FIG. 12 is a drawing showing an example of an operation screen display for displaying estimated installation error (θ, a, b).

Operation screen 570 (hereinafter also referred to as "screen 3") shown in FIG. 12 is provided with rotation direction error display field 571, X-axis direction error display field 572, Y-axis direction error display field 573, redo button 574, and terminate button 575. Angle error θ is displayed in rotation direction error display field 571, X-axis direction distance error a in X-axis direction error display field 572, and Y-axis direction distance error b in Y-axis direction error display field 573. Redo button 574 is a button to allow the user to start over from the beginning. When redo button 574 is pressed, a "screen transition" command is sent to observation point setting section 110, and screen 1 (operation screen 510 shown in FIG. 6) is displayed. When Terminate button 575 is pressed, installation error output section 160 terminates display of screen 3, and also terminates operation of installation error estimating apparatus 100.

Estimated installation error (θ, a, b) is used to find a transformation matrix that performs coordinate conversion between a local coordinate system and global coordinate system. For example, in this embodiment, a local coordinates to global coordinates transformation matrix is created using estimated installation error (θ, a, b), and tag reader 200 local coordinate system positioning data is converted to global coordinates. By this means, results can be obtained that are equivalent to those when tag reader 200 is installed in a correct position and orientation by repeating precise measurement and correction. This shows that, even if the installation precision of tag reader 200 is inadequate, high-precision positioning is possible by estimating installation error (θ, a, b) accurately. Therefore, high-precision positioning can be implemented even if tag reader 200 installation is simple.

The description here refers to the predicted positioning distribution pattern creation method used by predicted pattern calculation section 120, which will be described in detail using FIG. 13 through FIG. 17.

First, a predicted positioning distribution pattern will be described.

In this embodiment, positioning results are acquired by placing wireless tag 300 in a place in clear view and without intervening obstructions vis-a-vis tag reader 200 (observation point 420), and performing measurement a plurality of times (for example, 100 times). A measurement result distribution extends in an arc of angle error a on spherical surface 600 with line segments linking tag reader 200 to two installation positions 411 and 430 as radius r (see FIG. 13A). Below, this distribution is called "arc-shaped positioning distribution" 601. Here, radius r is calculated using tag reader 200 installation position coordinates and observation point information 500 observation point coordinates 502. Also, angle error a is calculated based on a theoretical positioning distribution characteristic for each observation point coordinate 502, where a theoretical positioning distribution characteristic is derived from a result of positioning a wireless tag in an experimental environment beforehand.

FIG. 13B is a drawing in which the vicinity of observation point 430 shown in FIG. 13A is enlarged. In this embodiment, arc-shaped positioning distribution 601 is projected in a tangential direction at observation point 430. The reason for performing projection is that a positioning result is a multi-dimensional vector, and therefore dimensions are reduced by projection in a direction in which a characteristic emerges. Below, a projected distribution is called simply "positioning distribution" 602.

For example, if angle error a is small and radius r is sufficiently large, arc-shaped positioning distribution 601 can approximate positioning distribution 602 (the same applies when one or other of the conditions is satisfied). This means, for example, that if arc-shaped positioning distribution 601 represents a normal distribution, positioning distribution 602 on a straight line (tangent) can also be treated as a normal distribution.

Also, in order to differentiate between a predicted positioning distribution and a positioning distribution obtained from actual measurement results here, the former is called a "predicted positioning distribution" and the latter a "measured positioning distribution" below.

If positioning distribution width L is considered as a characteristic pattern of a predicted positioning distribution, width L of positioning distribution 602 (hereinafter referred to as "predicted positioning distribution pattern L") can be represented by equation 4 below, where "r" and "α" are the radius and angle error respectively in arc-shaped positioning distribution 601, as stated above.

[4]

$$L = 2 \cdot r \cdot \tan \alpha \quad \text{(Equation 4)}$$

In this embodiment, positioning distribution width (error distribution width) L is used as a positioning distribution pattern for both theoretical values and observed values, but the present invention is not limited to this. For example, for a positioning distribution pattern, a peak value of a positioning distribution or the like may be used as a positioning distribution pattern instead of positioning distribution width (error distribution width) L. Furthermore, in this embodiment it is also possible to use results of a statistical method such as principal component analysis as a positioning distribution pattern.

Next, a predicted positioning distribution pattern creation method will be described for a case in which tag reader 200 installation deviates when tag reader 200 is installed at (m/2, m/2, Rz) on the plan (see FIG. 3), for example. For convenience of explanation, separate descriptions will be given here for three possible cases.

First, a predicted positioning distribution pattern creation method will be described for a case in which tag reader 200 has been installed at the correct position, and in which the orientation of tag reader 200 nevertheless deviates.

Secondly, a predicted positioning distribution pattern creation method will be described for a case in which tag reader 200 is installed with the expected orientation of, and in which the position of tag reader 200 nevertheless deviates.

Thirdly, a predicted positioning distribution pattern creation method will be described for a case in which tag reader 200 is installed with deviation of both orientation and position.

(1) When Orientation Deviates

The first example of predicted positioning distribution pattern creation is for a case in which installation has been achieved at the correct position, but with deviation of orientation, when attempting to install tag reader 200 at (m/2, m/2, Rz) on the plan, for example. The predicted positioning distribution pattern creation method in this case will be described using FIG. 14.

Figure 14C:
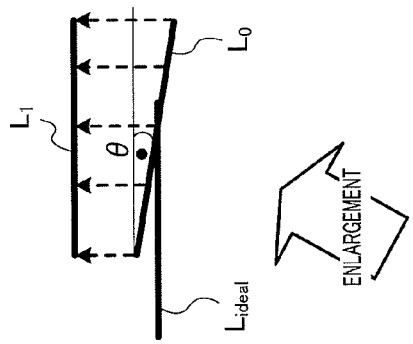
FIG. 14 provides drawings for explaining the concept of a predicted positioning distribution pattern when orientation deviates at the time of installation in this embodiment.

Solid-line coordinate system 610 shown in FIG. 14A results from parallel translation of the coordinate system assigned to the plan (global coordinate system 420) to position 411 at which installation of tag reader 200 is expected (hereinafter referred to as a "virtual global coordinate system"). Also, the dotted-line coordinate system shown in FIG. 14A is the coordinate system used in positioning (local coordinate system 421), held internally by tag reader 200. In this case, local coordinate system 421 of tag reader 200 is assumed to be rotated through angle θ relative to coordinate system 610. For the sake of simplicity, Z-axis (z-axis) direction coordinates are here assumed to be the same for tag reader 200 and wireless tag 300, and a description is given in terms of two-dimensional coordinates. Also, coordinates in a virtual global coordinate system are called "virtual global coordinates" below.

When, for example, both coordinate systems completely coincide, and wireless tag 300 is positioned at observation point 1 (m/2, m) and is measured a plurality of times, a positioning result in local coordinate system 421 output by tag reader 200 is the pattern represented by equation 4 in the x-axis direction.

However, in this case, the coordinates of observation point 1 are $(X_1, Y_1)$, as represented by equation 5 below, as local coordinates (X, Y) deviating by angle θ from virtual global coordinates (x, y). In this case, r=m/2. This radius r frequently occurs in the following equations, but is the same as in equation 5, and a description is omitted where it occurs.

[5]

$$\begin{pmatrix} X_1 \\ Y_1 \end{pmatrix} = \begin{pmatrix} \cos\theta & \sin\theta \\ -\sin\theta & \cos\theta \end{pmatrix} \begin{pmatrix} 0 \\ r \end{pmatrix} \quad \text{(Equation 5)}$$

Therefore, when a positioning result output by tag reader 200 is mapped directly to global coordinate system 420, observation point 1 coordinates become coordinates $(x_2, y_2)$ deviating as represented by equation 7 from original coordinates $(x_1, y_1)$ represented by equation 6 below.

$$\begin{pmatrix} x_1 \\ y_1 \end{pmatrix} = \begin{pmatrix} m/2 \\ m \end{pmatrix} = \begin{pmatrix} 0 \\ r \end{pmatrix} + \begin{pmatrix} m/2 \\ m-r \end{pmatrix} \quad \text{(Equation 6)}$$

$$\begin{pmatrix} x_2 \\ y_2 \end{pmatrix} = \begin{pmatrix} X_1 \\ Y_1 \end{pmatrix} + \begin{pmatrix} m/2 \\ m-r \end{pmatrix} \quad \text{(Equation 7)}$$

Figure 14B:
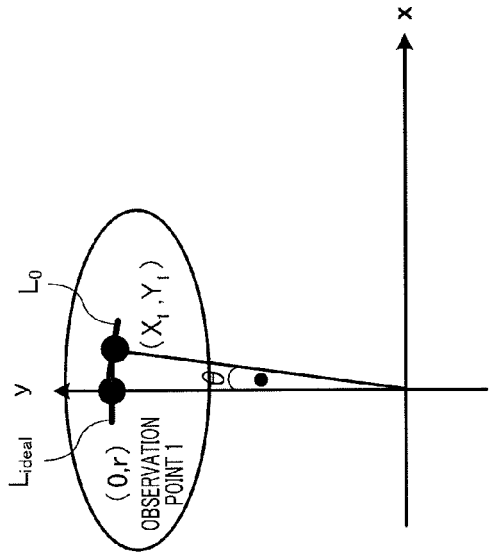
Figure 14A:
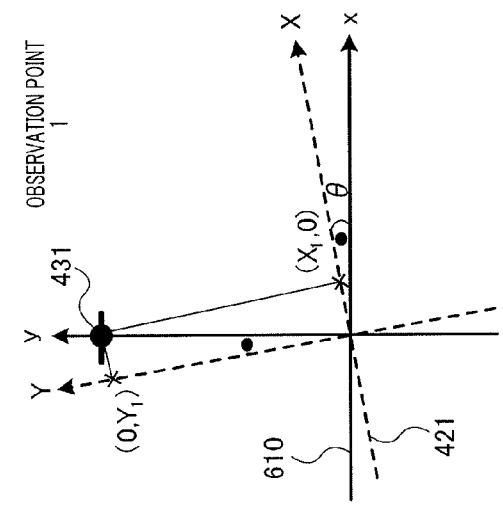
Figure 14D:
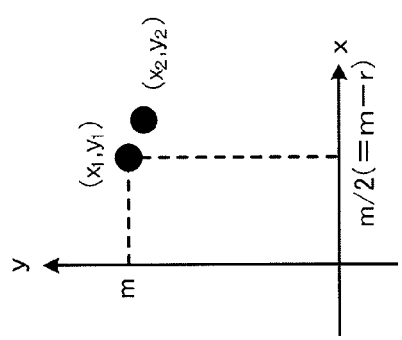

FIG. 14D is a drawing showing the positional relationship of these two pairs of coordinates $(x_1, y_1)$ and $(x_2, y_2)$. Terms $(m/2, m-r)^T$ (where T represents transposition) common to equation 6 and equation 7 represent the positional relationship between origin 410 in global coordinate system 420 and expected tag reader 200 installation position 411, and are fixed values.

At this time, predicted positioning distribution pattern $L_0$ deviates from predicted positioning distribution pattern $L_{ideal}$ represented by equation 4 when tag reader 200 is assumed to have been installed as expected (see FIG. 14B).

FIG. 14C is a principal-part enlarged view of FIG. 14B, showing the nature of predicted positioning distribution pattern deviation.

In this case, even if it is assumed that the coordinate system has been rotated, there is no change in the distance between tag reader 200 and wireless tag 300 (that is, the radius), and therefore there is no change in size between predicted positioning distribution pattern $L_{ideal}$ and predicted positioning distribution pattern $L_0$. Deviating predicted positioning distribution pattern $L_0$ has a shape resulting from rotating predicted positioning distribution pattern $L_{ideal}$ through an angle of $-\theta$.

Next, deviating predicted positioning distribution pattern $L_0$ is projected in a linear direction parallel to predicted positioning distribution pattern $L_{ideal}$, creating predicted positioning distribution pattern $L_1$. Predicted positioning distribution pattern $L_1$ can be represented by equation 8 below. The reason for performing projection will be explained when the analytical method used by variance pattern analysis section 140 is described later herein.

$$L_1 = 2 \cdot r \cdot \tan\alpha \cdot \cos\theta \quad \text{(Equation 8)}$$

(2) When Position Deviates

The second example of predicted positioning distribution pattern creation is for a case in which installation has been achieved with the expected orientation, but with deviation of position, when attempting to install tag reader 200 at (m/2, m/2, Rz) on the plan, for example. The predicted positioning distribution pattern creation method in this case will be described using FIG. 15.

Figure 15B:
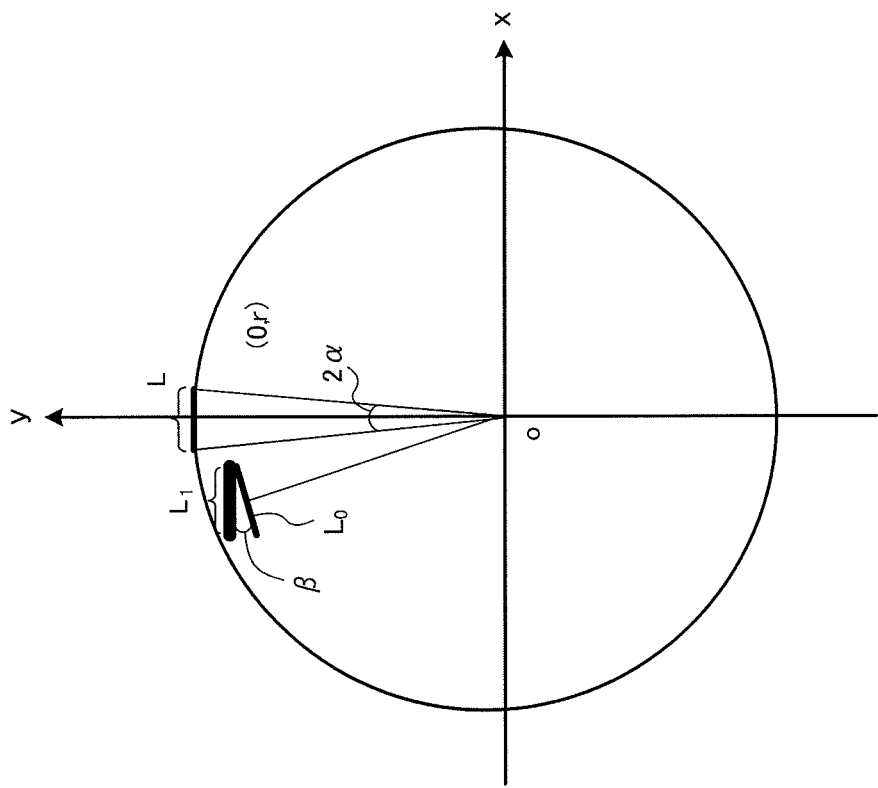
FIG. 15 provides drawings for explaining the concept of a predicted positioning distribution pattern when position deviates at the time of installation in this embodiment.
Figure 15A:
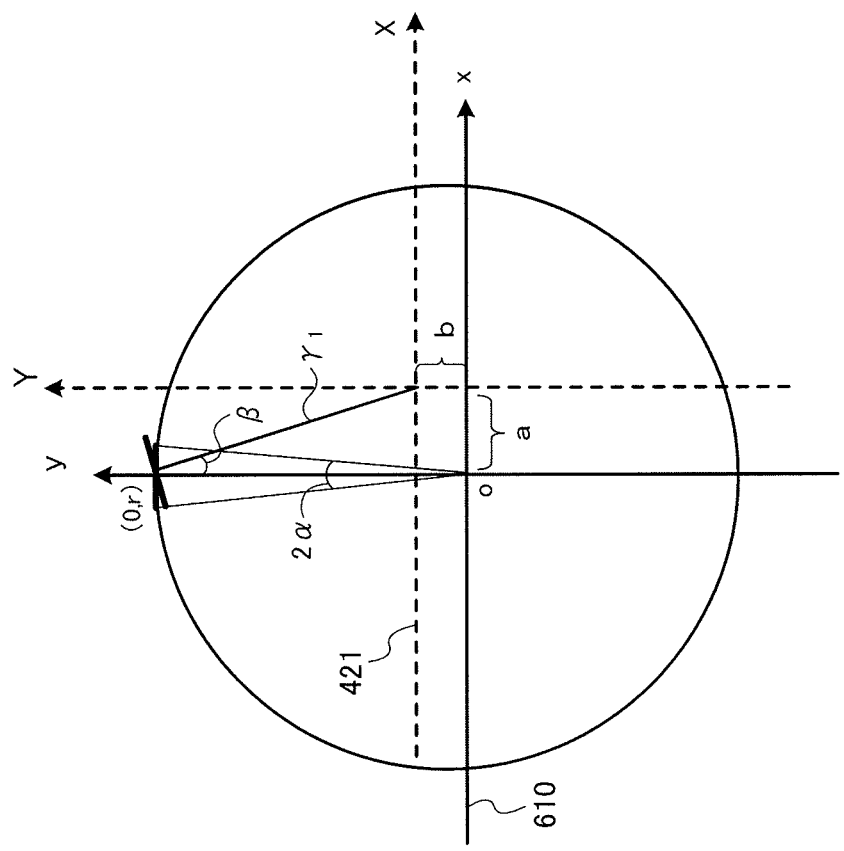

As in FIG. 14, the solid-line coordinate system shown in FIG. 15A is virtual global coordinate system 610, and the dotted-line coordinate system is local coordinate system 421. It is assumed that local coordinate system 421 of tag reader 200 deviates by a in the x-axis direction and by b in the y-axis direction with respect to virtual global coordinate system 610. For the sake of simplicity, here also, Z-axis (z-axis) direction coordinates are assumed to be the same for tag reader 200 and wireless tag 300, and a description is given in terms of two-dimensional coordinates.

When, for example, both coordinate systems fully coincide, and wireless tag 300 is positioned at observation point 1 (m/2, m) and is measured a plurality of times, a positioning result in local coordinate system 421 output by tag reader 200 is the pattern represented by equation 4 in the x-axis direction.

However, in this case, the distance between tag reader 200 and wireless tag 300 (that is, the radius) changes in local coordinate system 421 through the parallel translation and deviation of local coordinate system 421 with respect to virtual global coordinate system 610. Consequently, when the position deviates, a major change between predicted positioning distribution pattern $L_{ideal}$ and predicted positioning distribution pattern $L_0$ is caused by the change in radius r.

This is due to the fact that, as a characteristic of single-point positioning, angle error $\alpha$ shown in FIG. 13A is always the same for observation points aligned on the same radius. Therefore, as is clear from equation 4, if radius r increases, predicted positioning distribution pattern L also increases.

Here, if observation point 1 is viewed in local coordinate system 421, radius $r_1$ can be represented by equation 9 below.

$$r_1 = \sqrt{a^2 + (b-r)^2} \quad \text{(Equation 9)}$$

Also, a predicted positioning distribution pattern exists in a direction perpendicular to this radius $r_1$.

Furthermore, in local coordinate system 421 of tag reader 200 deviating by a in the x-axis direction and by b in the y-axis direction with respect to virtual global coordinate system 610, observation point 1 becomes $(X_1, Y_1)$ as represented by equation 10 below.

$$\begin{pmatrix} X_1 \\ Y_1 \end{pmatrix} = \begin{pmatrix} -a \\ r-b \end{pmatrix} \quad \text{(Equation 10)}$$

Therefore, when a positioning result output by tag reader 200 is mapped directly to a virtual global coordinate system, predicted positioning distribution pattern $L_0$ deviates from predicted positioning distribution pattern $L_{ideal}$ represented by equation 4 (see FIG. 15B).

Thus, deviating predicted positioning distribution pattern $L_0$ is projected in a linear direction parallel to predicted positioning distribution pattern $L_{ideal}$, and predicted positioning distribution pattern $L_1$ is created. Predicted positioning distribution pattern $L_1$ can be represented by equation 11 below.

$$L_1 = 2 \cdot r_1 \cdot \tan\alpha \cdot \cos\beta_1 \quad \text{(Equation 11)}$$
$$\text{where } \cos\beta1 = \cos\beta_1 = \frac{r-b}{\sqrt{a^2+(b-r)^2}}$$

(3) When Orientation and Position Deviate

The third example of predicted positioning distribution pattern creation is for a case in which both orientation and position deviate when attempting to install tag reader 200 at (m/2, m/2, Rz) on the plan, for example. Predicted positioning distribution pattern creation in this case will be described using FIG. 16.

Figure 16A:
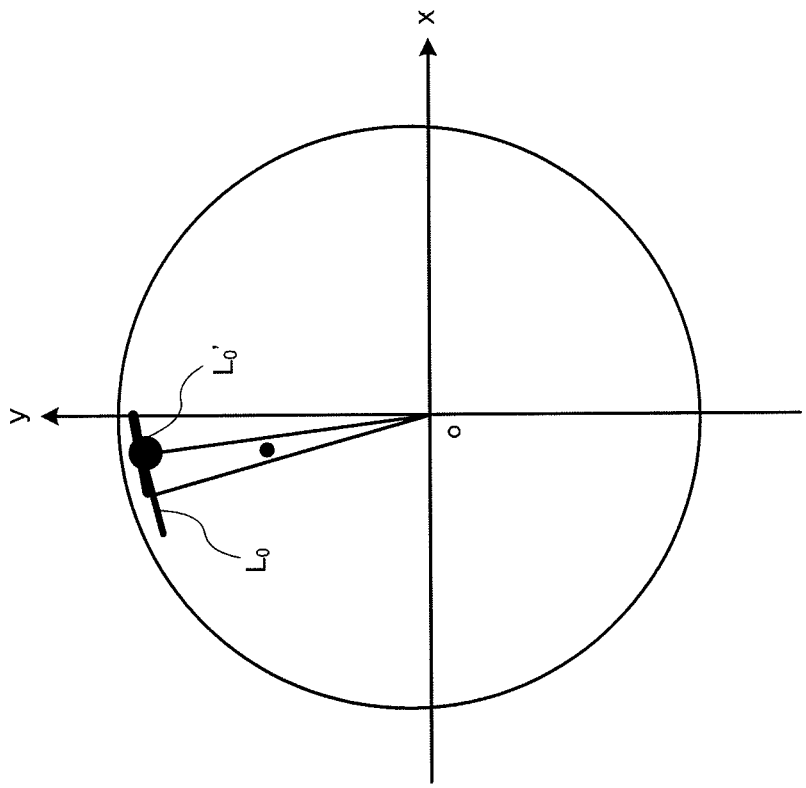
FIG. 16 provides drawings for explaining the concept of a predicted positioning distribution pattern when orientation and position deviate at the time of installation in this embodiment.
Figure 16B:
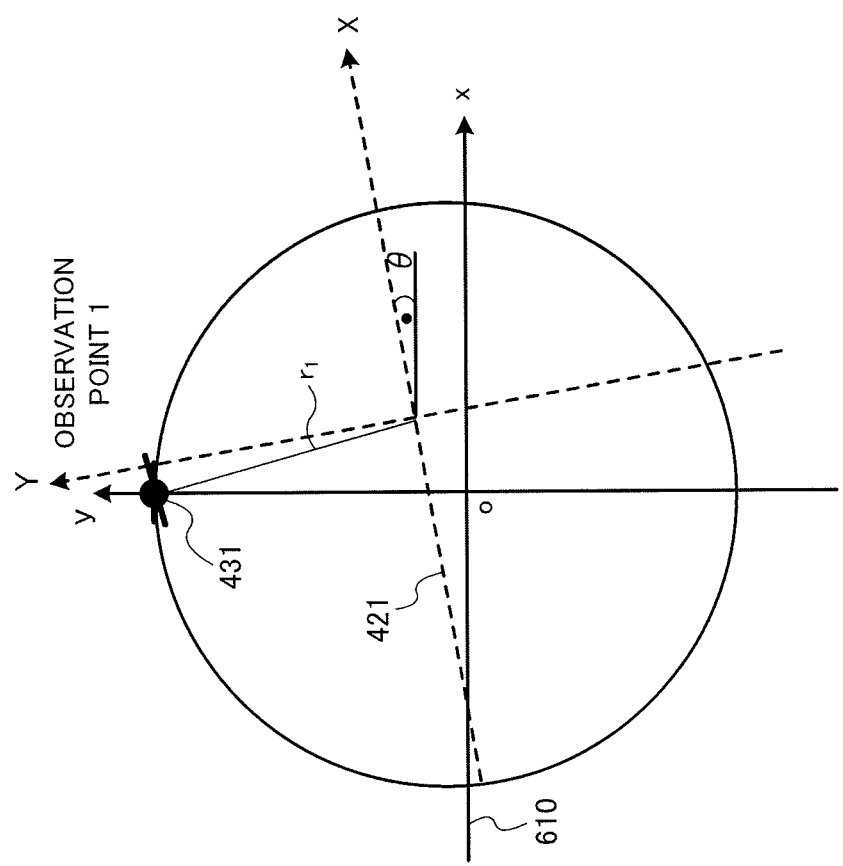

As in FIG. 14, the solid-line coordinate system shown in FIG. 16A is virtual global coordinate system 610, and the dotted-line coordinate system is local coordinate system 421. It is assumed that local coordinate system 421 of tag reader 200 deviates by a in the x-axis direction, by b in the y-axis direction and by θ in the rotation direction, with respect to virtual global coordinate system 610.

For the sake of simplicity, here also, Z-axis (z-axis) direction coordinates are assumed to be the same for tag reader 200 and wireless tag 300, and a description is given in terms of two-dimensional coordinates.

A case in which both the orientation and position of tag reader 200 deviate can be represented by a linear sum of a first rotation and a second parallel translation.

Therefore, when both the orientation and position of tag reader 200 deviate, a rotation component should be added to equation 11. That is to say, deviating predicted positioning distribution pattern $L_0$ shown in FIG. 15B should be rotated through an angle of −θ as shown in FIG. 14C (see deviating predicted positioning distribution pattern $L_0'$ shown in FIG. 16B).

Therefore, x-axis-direction predicted positioning distribution pattern $L_1$ for observation point 1 can be represented by equation 12 below.

[12]

$$L_1 = 2 \cdot r_1 \cdot \tan \alpha \cdot \cos T_1 \quad \text{(Equation 12)}$$

where $T_1 = T_1 = \beta_1 - \theta$

Predicted positioning distribution patterns for the three observation points 1 through 3 will now be described, with schematic diagrams thereof shown in FIG. 17.

Figure 17:
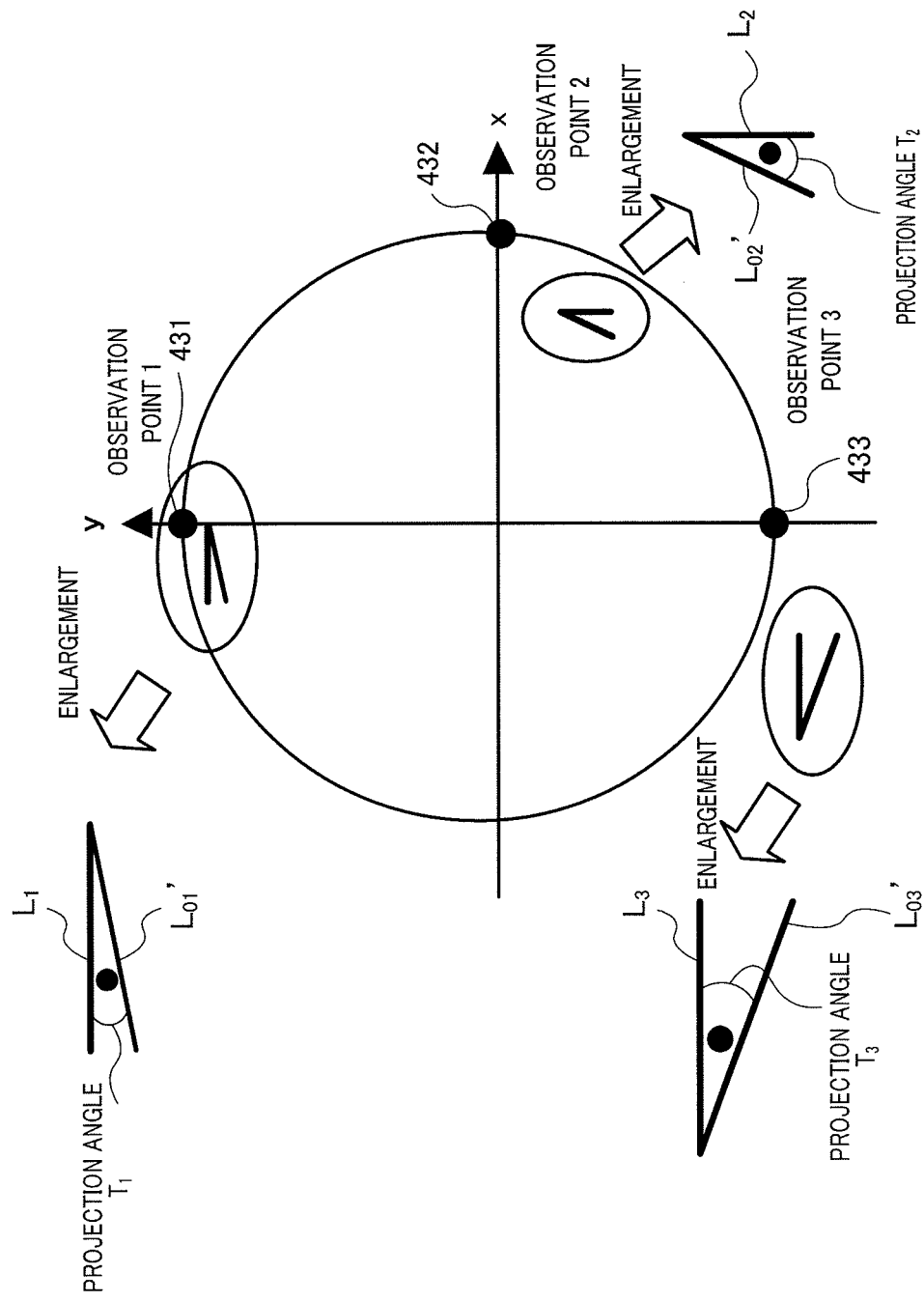
FIG. 17 is a schematic diagram showing an example of a predicted positioning distribution pattern at a plurality of observation points in this embodiment.

As shown in FIG. 17, for observation point 1, projection is performed using projection angle $T_1$ for pre-projection deviating predicted positioning distribution pattern $L_0'$ (represented here by $L_{01}'$ to differentiate it from other observation points), and predicted positioning distribution pattern $L_1$ is acquired.

The above concept can be applied to other observation points—for example, observation point 2 (m, m/2) and observation point 3 (m/2, 0). In this case, y-axis-direction predicted positioning distribution pattern $L_2$ for observation point 2 is represented by equation 13, and x-axis-direction predicted positioning distribution pattern $L_3$ for observation point 3 is represented by equation 14.

[13]

$$L_2 = 2 \cdot r_2 \cdot \tan \alpha \cdot \cos T_2 \quad \text{(Equation 13)}$$

$$\text{where } \cos \beta_2 = \frac{r-a}{\sqrt{(r-a)^2 + b^2}}$$

$$r_2 = \sqrt{(r-a)^2 + b^2}$$

$$T_2 = \beta_2 + \theta$$

[14]

$$L_3 = 2 \cdot r_3 \cdot \tan \alpha \cdot \cos T_3 \quad \text{(Equation 14)}$$

$$\text{where } \cos \beta_3 = \frac{r+b}{\sqrt{a^2 + (r+b)^2}}$$

$$r_3 = \sqrt{a^2 + (b+r)^2}$$

$$T_3 = \beta_3 + \theta$$

As shown in FIG. 17, for observation point 2, projection is performed using projection angle $T_2$ for pre-projection deviating predicted positioning distribution pattern $L_{02}'$, and predicted positioning distribution pattern $L_2$ is acquired. Also, for observation point 3, projection is performed using projection angle $T_3$ for pre-projection deviating predicted positioning distribution pattern $L_{03}'$, and predicted positioning distribution pattern $L_3$ is acquired.

In this way, predicted pattern calculation section 120 creates predicted positioning distribution patterns $L_1$ through $L_3$ for observation points 1 through 3 specified by observation point information 500.

A detailed description of the analytical method used by variance pattern analysis section 140 will now be described, with additional reference to FIG. 18.

On receiving log file 541 (observation data 520) from observation data input section 130, variance pattern analysis section 140 creates coordinate management tables 550 shown in FIG. 10. The actual procedure is as follows.

First, variance pattern analysis section 140 reads log file 541 received from observation data input section 130, one line at a time. In the case of the example shown in FIG. 9B, variance pattern analysis section 140 reads the first line for which the sequence number starts at "1," and on confirming that the tag ID is "1" and the observation point name is "observation point 1," determines whether or not these are already known. At this time, tag ID "1" and observation point name "1" are not known, and therefore variance pattern analysis section 140 creates coordinate management table 551 in which the tag ID is managed as "1" and the observation point name as "1."

At this time, variance pattern analysis section 140 stores "1" as the tag ID and "observation point 1" as the observation point name when coordinate management table 551 is created. Serial numbers start from 1, and the serial number is incremented by 1 each time new coordinate information is added. For the x-coordinate value, y-coordinate value, and reliability, log file 541 data is copied.

Variance pattern analysis section 140 processes the second line and third line of log file 541 in the same way as the first line, creating coordinate management tables 552 and 553 respectively, and copying the respective x-coordinate value, y-coordinate value, and reliability.

When the fourth line of log file 541 is read, since tag ID "1" and observation point name "1" are already known, variance pattern analysis section 140 updates previously created coordinate management table 551. Specifically, variance pattern analysis section 140 adds serial number "2," x-coordinate value "$x_{41}$," y-coordinate value "$x_{41}$," and reliability "A." Thereafter, variance pattern analysis section 140 repeats the same kind of processing until the last line of the file.

Next, variance pattern analysis section 140 creates measured positioning distribution pattern list 560 shown in FIG. 11, using created coordinate management tables 550.

Figure 18:
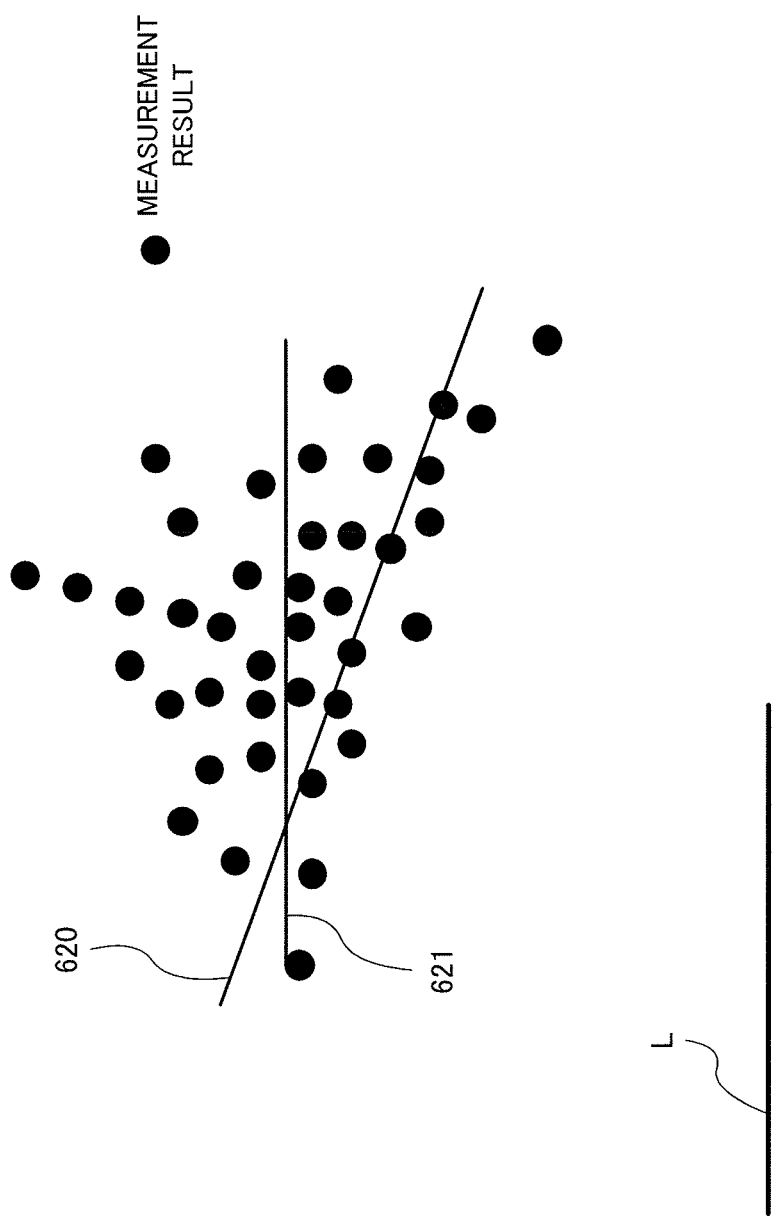
FIG. 18 is a drawing for explaining the concept of a case in which positioning results are dispersed in this embodiment.

Since actually measured results are distributed in two dimensions, different straight lines 620 and 621 may be candidates for checking a positioning distribution characteristic, as shown in FIG. 18. Therefore, it is difficult to uniquely identify measured positioning distribution pattern S.

Thus, in this embodiment, for example, a measurement result distribution is projected in a direction perpendicular to predicted positioning distribution pattern L, and measured positioning distribution pattern S is extracted. In the example shown in FIG. 18, measured positioning distribution pattern S exists on straight line 621 parallel to predicted positioning distribution pattern L.

When projection is performed, the advantage of comparison in the same dimension can be applied to a characteristic comparison between predicted positioning distribution pattern L and measured positioning distribution pattern S. Also, if the projection angle is small, it is possible to approximate a characteristic of pre-projection data directly. For example, data resulting from projecting normally distributed pre-projection data can also be regarded as normally distributed.

That is to say, variance pattern analysis section 140 extracts an x-axis direction pattern as measured positioning distribution pattern $S_1$ of wireless tag 300 installed at observation point 1 (m/2, m) on the y-axis of the global coordinate system; variance pattern analysis section 140 extracts a y-axis direction pattern as measured positioning distribution pattern $S_2$ of wireless tag 300 installed at observation point 2 (m, m/2) on the x-axis of the global coordinate system; and variance pattern analysis section 140 extracts an x-axis direction pattern as measured positioning distribution pattern $S_3$ of wireless tag 300 installed at observation point 3 (m/2, 0) on the y-axis of the global coordinate system.

Variance pattern analysis section 140 records the results of performing measured positioning distribution pattern analysis in this way in the form of measured positioning distribution pattern list 560 shown in FIG. 11, for example. As explained above, measured positioning distribution pattern list 560 comprises, for example, a tag ID, observation result x-coordinate or y-coordinate average value μ and variance σ, and pattern length P.

Here, pattern length P is extracted, for example, by means of a computational formula decided beforehand according to a normal distribution characteristic (see equation 15 below). Here, N is a standardized score in a standard normal probability table.

[15]

$$P = 2*N*\sigma \quad \text{(Equation 15)}$$

If this computational formula is applied to the case of tag ID "1" projected in the x-axis direction, when N=2, this means that approximately 95% of data is included in μ−2σ≤x≤μ+2σ.

Variance pattern analysis section 140 can calculate pattern length P by applying N that has been defined beforehand in this way.

The actual processing performed by installation error estimating section 150 will now be described in detail.

Installation error estimating section 150 acquires, in advance, predicted positioning distribution pattern L for each observation point at which wireless tag 300 is installed from predicted pattern calculation section 120, and measured positioning distribution pattern S based on observation data 520 from variance pattern analysis section 140. Then installation error estimating section 150 estimates installation error (θ, a, b) by solving an equation resulting from substituting these in equation 3.

Specifically, equation 16 below holds true for wireless tag 300a placed at global coordinate system observation point 1 (m/2, m).

[16]

$$S_1 = 2 \cdot r_1 \cdot \tan\alpha \cdot \cos T_1 \quad \text{(Equation 16)}$$
$$\text{where } \cos\beta_1 = \frac{r-b}{\sqrt{a^2 + (b-r)^2}}$$
$$r_1 = \sqrt{a^2 + (b-r)^2}$$
$$T_1 = \beta_1 - \theta$$

Also, equation 17 below holds true for wireless tag 300b placed at global coordinate system observation point 2 (m, m/2).

[17]

$$S_2 = 2 \cdot r_2 \cdot \tan\alpha \cdot \cos T_2 \quad \text{(Equation 17)}$$
$$\text{where } \cos\beta_2 = \frac{r-a}{\sqrt{(r-a)^2 + b^2}}$$
$$r_2 = \sqrt{(r-a)^2 + b^2}$$
$$T_2 = \beta_2 + \theta$$

Furthermore, equation 18 below holds true for wireless tag 300c placed at global coordinate system observation point 3 (m/2, 0).

[18]

$$S_3 = 2 \cdot r_3 \cdot \tan\alpha \cdot \cos T_3 \quad \text{(Equation 18)}$$
$$\text{where } \cos\beta_3 = \frac{r+b}{\sqrt{a^2 + (r+b)^2}}$$
$$r_3 = \sqrt{a^2 + (b+r)^2}$$
$$T_3 = \beta_3 + \theta$$

Therefore, installation error (θ, a, b) can be calculated by solving three-way simultaneous equations comprising equation 16, equation 17, and equation 18.

In the following description, the operation of installation error estimating apparatus 100 having the above configuration will be described using FIG. 19.

First, prior to error estimation processing by installation error estimating apparatus 100, the user performs positioning in order to install tag reader 200. In this embodiment, there is no particular restriction on the positioning method. For example, positioning can be performed by using a tape measure to mark positions m/2 in the x-axis direction and m/2 in the y-axis direction from origin 410 of floor 401. At this time, there may be deviation from the expected-value position (m/2, m/2, Rz) and orientation.

Next, the user fixes tag reader 200 at the decided position. In this embodiment, there is no particular restriction on the fixing method. A known method whereby a radio LAN (Local Area Network) access point is fixed to ceiling 402, for example, can be used. Here too, as in the case of positioning, there may be deviation from the expected-value position (m/2, m/2, Rz) and orientation.

The user selects a minimum of three places—for example, observation point 431 (observation point 1) having coordinates (m/2, m, Rz), observation point 432 (observation point 2) having coordinates (m, m/2, Rz), and observation point 433 (observation point 3) having coordinates (m/2, 0, Rz). Then the user installs wireless tags 300 with previously known tag IDs at selected observation points 1 through 3. As actual examples of wireless tag 300 installation, for instance, wireless tag 300a with a tag ID of "1" is installed at observation point 1, wireless tag 300b with a tag ID of "2" is installed at observation point 2, and wireless tag 300c with a tag ID of "3" is installed at observation point 3.

It is assumed that tag reader 200 has already been installed in the vicinity of expected-value position (m/2, m/2, Rz) in this way. Next, with the three wireless tags 300a through 300c installed in the vicinity of the three observation points 1 through 3, the user starts installation error estimating apparatus 100. That is to say, the processing in the flowchart shown in FIG. 19 is started.

First, in step S1000, observation point setting section 110 performs display of screen 1. Specifically, when the user starts installation error estimating apparatus 100, observation point setting section 110 displays operation screen 510 (screen 1) shown in FIG. 6. By this means, the user can input data necessary for setting observation point information 500.

Then, in step S1010, the user performs input of data necessary for setting observation point information. Specifically, the user inputs observation point information data items (tag ID, observation point coordinates, and observation point name) in tag ID input column 511, observation point coordinate input column 512, and observation point name input column 513 respectively in screen 1 displayed in step S1000. For example, observation point 1, observation point 2, and observation point 3 coordinates are input in observation point coordinate input column 512. An observation point name may be input by the user, or a default value may be displayed.

Then, in step S1020, observation point setting section 110 determines whether or not setting completed button 514 has been pressed. If the result of this determination is that setting completed button 514 has been pressed (S1020: YES), observation point setting section 110 proceeds to step S1030. On the other hand, if setting completed button 514 has not been pressed (S1020: NO), observation point setting section 110 returns to step S 1010. That is to say, observation point setting section 110 continues to display screen 1 until setting completed button 514 is pressed.

In step S1030, observation point setting section 110 performs observation point information setting. Specifically, on receiving a "set" command by means of setting completed button 514, observation point setting section 110 mutually associates the data (tag ID, observation point coordinates, and observation point name) input in step S1010, and creates and stores observation point information 500 shown in FIG. 5.

Then, in step S 1040, predicted pattern calculation section 120 performs predicted positioning distribution pattern creation for all the observation points. Specifically, predicted pattern calculation section 120 acquires observation point information 500 (tag ID 501, observation point coordinates 502, and observation point name 503) set in step S1030 from observation point setting section 110. Next, predicted pattern calculation section 120 predicts a positioning distribution (theoretical values) and creates predicted positioning distribution pattern L for all observation points specified by observation point information 500. The predicted positioning distribution pattern L creation method is as described above. For example, predicted pattern calculation section 120 creates predicted positioning distribution patterns $L_1$ through $L_3$ for observation points 1 through 3 specified by observation point information 500 in accordance with the above-described creation method. On completing the creation of predicted positioning distribution patters L for all the observation points, predicted pattern calculation section 120 sends a "screen transition" command to observation data input section 130.

Then, in step S1050, observation data input section 130 performs display of screen 2. Specifically, on receiving a "screen transition" command from predicted pattern calculation section 120, observation data input section 130 displays operation screen 530 (screen 2) shown in FIG. 8.

Then, in step S1060, observation data input section 130 determines whether or not positioning start button 533 has been pressed. If the result of this determination is that positioning start button 533 has been pressed (S1060: YES), observation data input section 130 proceeds to step S1070. On the other hand, if positioning start button 533 has not been pressed (S1060: NO), observation data input section 130 returns to step S1050, and continues to display screen 2. For example, when the user inputs a filename in log file input field 531 and presses positioning start button 533 in order to perform file output of observation data 520, observation data input section 130 passes a "start positioning" command to tag reader 200.

In step S1070, observation data input section 130 executes wireless tag 300 positioning. Specifically, observation data input section 130 passes a "start positioning" command to tag reader 200. On receiving a "start positioning" command from observation data input section 130, tag reader 200 starts wireless tag 300 positioning, and passes observation data 520 to observation data input section 130.

On receiving observation data 520 from tag reader 200, observation data input section 130 sequentially displays data included in received observation data 520 in observation data display field 532 of screen 2 (see FIG. 9A). At the same time, observation data input section 130 writes a positioning result to a file specified by the user (see FIG. 9B). If, for example, 100 observations (positioning operations) have been recommended per wireless tag, observation data input section 130 checks the sequence number, and automatically terminates positioning when sequence number 300 is reached. In this embodiment, the number of observations is set at 100 per wireless tag, for example.

Then, in step S1080, observation data input section 130 determines whether or not the number of observations has reached a predetermined number. If the result of this determination is that the number of observations has reached the predetermined number (S1080: YES), observation data input section 130 proceeds to step S1090. On the other hand, if the number of observations has not reached the predetermined number (S1080: NO), observation data input section 130 returns to step S1070, and continues wireless tag 300 positioning. For example, in this embodiment three wireless tags 300a, 300b, and 300c are installed, and therefore the total number of observations is 300. Therefore, observation data input section 130 checks the sequence number, and when the sequence number reaches 300, determines that the number of observations has reached the predetermined number (300). When wireless tag 300 positioning terminates, observation data input section 130 passes log file 541, to which observation data 520 has been written, to variance pattern analysis section 140.

In step S1090, variance pattern analysis section 140 performs measured positioning distribution pattern creation for all the observation points. Specifically, variance pattern analysis section 140 acquires observation data 520 (log file 541) from observation data input section 130, and performs analysis of observation data 520. Next, variance pattern analysis section 140 stores the results in measured positioning distribution pattern list 560, and passes measured positioning distribution pattern list 560 to installation error estimating section 150. For example, variance pattern analysis section 140 creates coordinate management tables 550 shown in FIG. 10 by means of the above-described analytical method, and creates measured positioning distribution pattern list 560 shown in FIG. 11 using created coordinate management tables 550.

Then, in step S1100, installation error estimating section 150 performs installation error estimation. Specifically, installation error estimating section 150 acquires predicted positioning distribution pattern L of each wireless tag 300 observation point created by predicted pattern calculation section 120 in step S1040, and acquires measured positioning distribution pattern S based on observation data 520 created by variance pattern analysis section 140 in step S1090. Next, installation error estimating section 150 estimates installation error (θ, a, b) by solving an equation resulting from substituting the above in equation 3. For example, equation 16 holds true for wireless tag 300a placed at global coordinate system observation point 1 (m/2, m), equation 17 holds true for wireless tag 300b placed at global coordinate system observation point 2 (m, m/2), and equation 18 holds true for wireless tag 300c placed at global coordinate system observation point 3 (m/2, 0). Therefore, installation error (θ, a, b) can be calculated by solving three-way simultaneous equations comprising equation 16, equation 17, and equation 18. On completing installation error (θ, a, b) estimation, installation error estimating section 150 passes estimation results (θ, a, b) to installation error output section 160.

Then, in step S1110, installation error output section 160 performs display of the installation error estimation results in screen 3. Specifically, on receiving installation error (θ, a, b) estimated in step S1100 from installation error estimating section 150, installation error output section 160 displays operation screen 570 (screen 3) shown in FIG. 12. In FIG. 12, angle error θ is displayed in rotation direction error display field 571, X-axis direction distance error a is displayed in X-axis direction error display field 572, and Y-axis direction distance error b is displayed in Y-axis direction error display field 573.

Then, in step S1120, installation error output section 160 determines whether or not redo button 574 has been pressed. If the result of this determination is that redo button 574 has been pressed (S1120: YES), installation error output section 160 returns to step S1000. On the other hand, if redo button 574 has not been pressed (S1120: NO), installation error output section 160 proceeds to step S1130. For example, when the user presses redo button 574, installation error output section 160 sends a "screen transition" command to observation point setting section 110. On receiving a "screen transition" command from installation error output section 160, observation point setting section 110 displays screen 1. Therefore, from this point onward, the user can redo the processing from the start.

In step S1130, installation error output section 160 determines whether or not Terminate button 575 has been pressed. If the result of this determination is that Terminate button 575 has been pressed (S1130: YES), installation error output section 160 terminates display of screen 3, and also terminates operation of installation error estimating apparatus 100. On the other hand, if Terminate button 575 has not been pressed (S1130: NO), installation error output section 160 returns to step S1110, and continues to display screen 3.

In the above description, a case has been described by way of example in which wireless tags 300 and tag reader 200 are installed at the same height, but the present invention is not limited to this, and it is also possible for wireless tags 300 to be installed at a different height from tag reader 200.

A case will now be described in which wireless tags 300 and tag reader 200 are installed at different heights, taking a case in which tag reader 200 has been installed at the correct position but with deviation of its orientation, as an example. The same kind of method can also be applied to a case in which tag reader 200 is installed with the expected orientation of but with deviation of its position, and a case in which tag reader 200 is installed with deviation of both orientation and position, and therefore descriptions of these cases will be omitted here.

FIG. 20 is a conceptual diagram for explaining a case in which three-dimensional data is processed. FIG. 20 shows a case in which wireless tag 300 is installed and positioned at observation point 434 (observation point 1') deviating in the z-axis direction from observation point 431 (observation point 1) having coordinates (m/2, m, Rz). It is assumed that the coordinates of observation point 1' are (m/2, m, Rz').

Figure 20B:
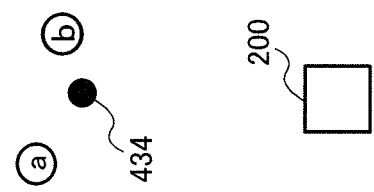
FIG. 20 is a drawing for explaining a case in which three-dimensional data is processed in this embodiment.
Figure 20A:
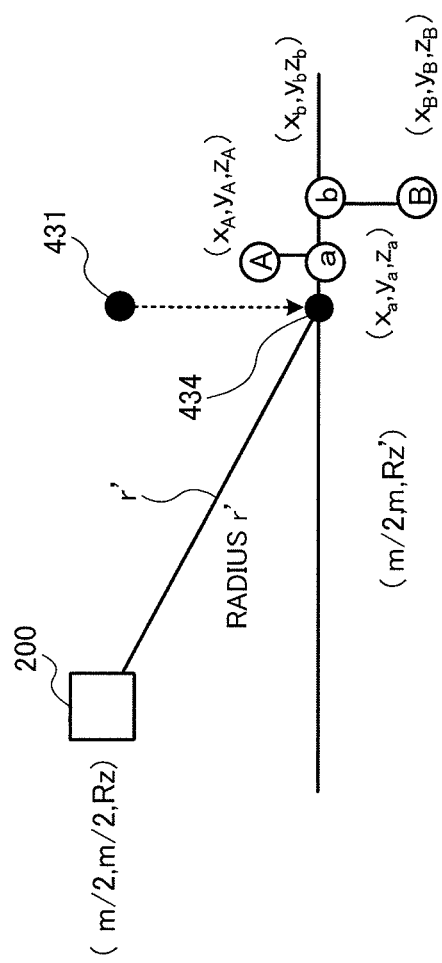

FIG. 20A is an explanatory drawing when the line of sight is positioned in a positive-to-negative direction on the x-axis, and FIG. 20B is an explanatory drawing when the line of sight is positioned in a positive-to-negative direction on the z-axis from directly above tag reader 200. Here, a description is given with A $(x_A, y_A, z_A)$ and B $(x_B, y_B, z_B)$ extracted from a plurality of wireless tag 300 positioning results.

First, for predicted positioning distribution pattern L, radius r may be replaced by radius r' shown in FIG. 20A. Radius r' can be represented by equation 19 below.

[19]

$$r' = \sqrt{(m/2)^2 + (R_z - R_z')^2} \quad \text{(Equation 19)}$$

Also, in the above description, when the z-coordinate of the observation point at which wireless tag 300 is placed is Rz, measured positioning distribution pattern S can be interpreted as being the result of analyzing the result of projecting the positioning result onto an x-y plane represented by z=Rz.

Therefore, even when positioning results are represented by three-dimensional coordinates, A $(x_A, y_A, z_A)$ is projected onto an x-y plane represented by z=Rz', becoming a $(x_a, y_a, z_a)$, and B $(x_B, y_B, z_B)$ is projected onto the same x-y plane, becoming b $(x_b, y_b, z_b)$. As explained above, three-dimensional data processing can perform analysis on a two-dimensional plane as shown in FIG. 20B in the same way as in FIG. 18.

By this means, even when positioning results are represented by three-dimensional coordinates, installation error (θ, a, b) can be estimated by calculating predicted positioning distribution pattern L and measured positioning distribution pattern S, as explained above.

In this embodiment, a case has been described in which, when a user installs tag reader 200, wireless tags 300 are placed peripheral to tag reader 200, and an installation error estimating apparatus estimates tag reader 200 installation error based on relevant observation data (positioning results).

Therefore, an installation error estimating apparatus of this embodiment does not require special installation structure, parts, and the like for tag reader 200, and does not require a high degree of expertise in installation and measurement on the part of installation engineers. Consequently, time for measurement and adjustment using a jig or tool requiring expertise can be eliminated when installing tag reader 200. Also, a person with no special experience, know-how, or the like can easily perform installation of tag reader 200. Thus, the effort required for tag reader 200 installation can be greatly reduced in terms of equipment, personnel, and time, enabling implementation costs to be greatly reduced.

In short, according to this embodiment, error-free, high-precision positioning can be achieved with simple installation, without a high degree of expertise, special skills, or the like.

In this embodiment, the description has assumed initial installation work, but the present invention is not limited to this. For example, it is also possible to apply the present invention to periodic maintenance as well as initial installation work.

In this embodiment, the description has assumed a case in which installation error is in the rotation direction, the x-axis direction, and the y-axis direction, but the present invention is not limited to this. For example, it is also possible to apply the present invention to a case involving only the rotation direction, or a case involving only the x-axis direction and y-axis direction.

For example, in a case involving only the rotation direction, "0" should be substituted for a and b in equation 3. In this case, only a single variable, θ, is found, and therefore a minimum of one observation point is sufficient.

Also, in a case involving only the x-axis direction and y-axis direction, "0" should be substituted for θ in equation 3. In this case, only two variables, a and b, are found, and therefore a minimum of two observation points are sufficient.

In this embodiment, the description has assumed a scenario in which three wireless tags—300a, 300b, and 300c—are installed peripheral to tag reader 200, and are measured simultaneously, but the present invention is not limited to this. For example, if there are marked individual differences between wireless tags, measurement times for individual wireless tags may be staggered.

In this embodiment, a single-point positioning method has been described whereby tag reader 200 is installed at one place, a signal transmitted by tag reader 200 is reflected by wireless tag 300, and a distance and direction of arrival are estimated based on the reflected signal, and are converted to a position. However, the present invention is not limited to this. For example, it is also possible to apply the present invention to a TDOA (Time Difference of Arrival) method whereby three or more tag readers are installed, and position calculation is performed using differences in times of reception from wireless tags.

In this embodiment, a description has been given of a predicted positioning distribution pattern that utilizes an arc-shaped positioning distribution characteristic whereby the distance from tag reader 200 to an observation point at which wireless tag 300 is installed is taken as the radius, with tag reader 200 as the center, but the present invention is not limited to this. For example, a predicted positioning distribution pattern may also utilize a radial-direction distribution characteristic.

Embodiment 2

Embodiment 2 is a case in which, when a tag reader is installed, a wireless tag is placed peripheral to the tag reader (at an observation point), the position of the wireless tag is measured, tag reader installation error is estimated based on obtained observation data, and the estimated installation error is evaluated.

This embodiment will now be described using FIG. 21 through FIG. 24.

Figure 21:
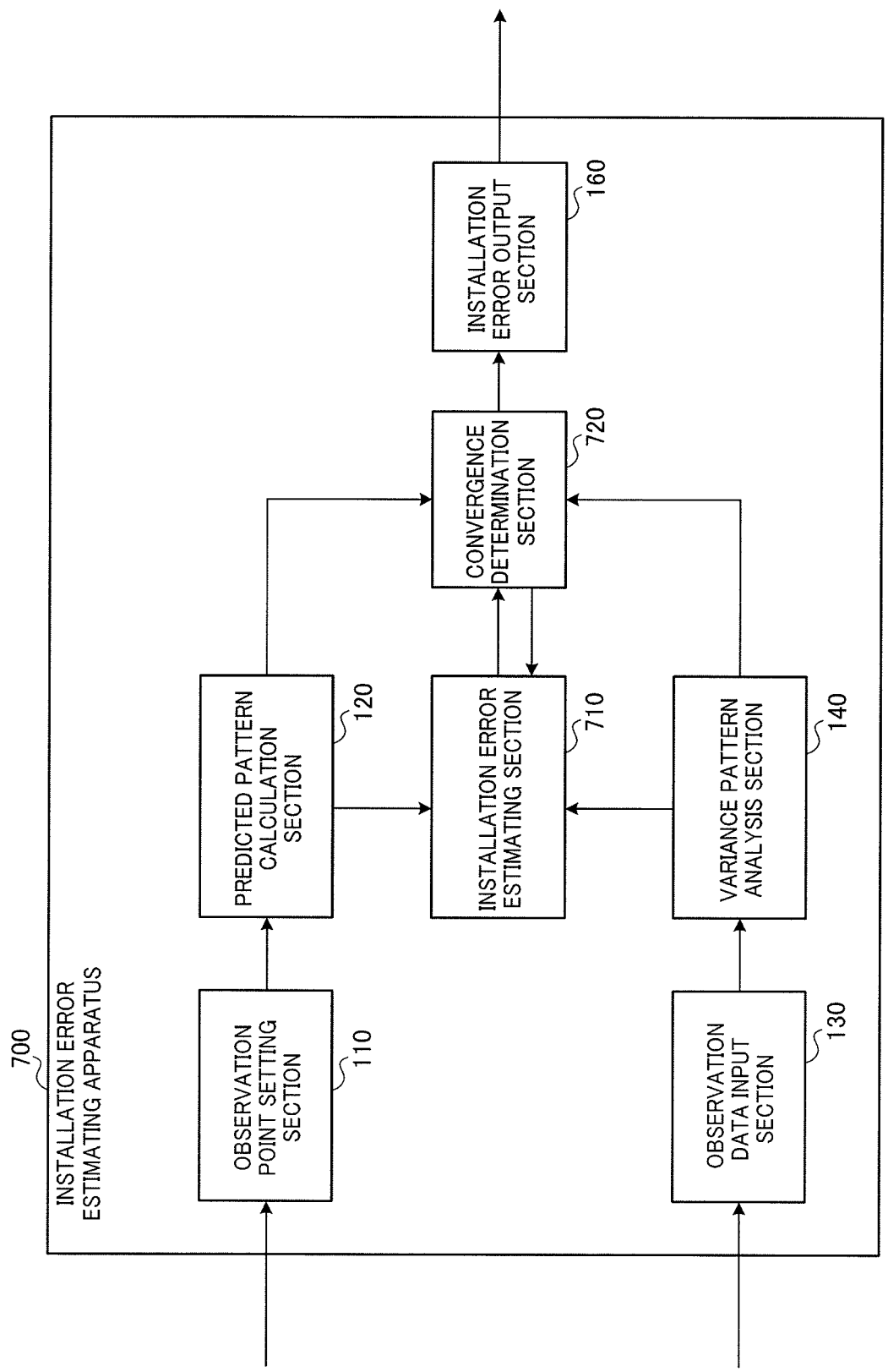
FIG. 21 is a block diagram showing the configuration of an installation error estimating apparatus according to Embodiment 2 of the present invention.

FIG. 21 is a block diagram showing the configuration of an installation error estimating apparatus according to Embodiment 2 of the present invention. This installation error estimating apparatus 700 has a similar basic configuration to installation error estimating apparatus 100 corresponding to Embodiment 1 shown in FIG. 4, and configuration elements in FIG. 21 identical to those in FIG. 4 are assigned the same reference codes as in FIG. 4 and descriptions thereof are omitted here.

Installation error estimating apparatus 700 shown in FIG. 21 has convergence determination section 720 in addition to observation point setting section 110, predicted pattern calculation section 120, observation data input section 130, variance pattern analysis section 140, installation error estimating section 710, and installation error output section 160.

The following description centers in detail upon convergence determination section 720, which is the main area of difference between installation error estimating apparatus 100 according to Embodiment 1 shown in FIG. 4 and installation error estimating apparatus 700 according to this embodiment shown in FIG. 21.

In Embodiment 1, wireless tags 300a, 300b, and 300c were installed in places in clear view of tag reader 200, and therefore communication conditions were good. This is shown by the fact that reliability continues to be evaluated at the highest rank of "A" in observation data 520 shown in FIG. 7. The quality (reliability) of communication conditions can be acquired by measuring signal level, for example.

However, if furniture or fixtures are present within positioning target area 400 in which wireless tag 300 position detection is performed, reflected waves in response to a transmission wave from tag reader 200 increase, and positioning precision of wireless tag 300 may decline.

In this case, it is not evident at the time of installation at which observation points positioning precision of wireless tag 300 is good or bad beforehand. Thus, in this embodiment, provision is made for three or more wireless tags 300 to be installed peripheral to tag reader 200, and for an absolute number of observation points for which positioning precision is good to be increased.

A characteristic of this embodiment is that an observation point that should be involved in installation error estimation is selected based on reliability at the time of wireless tag 300 position detection. Also, a characteristic of this embodiment is that convergence determination section 720 estimates maximum-likelihood installation error allowing the error distribution of all selected observation points to be best approximated.

Installation error estimating section 710 has a similar basic configuration to installation error estimating section 150 in Embodiment 1, but differs in the following respect. Installation error estimating section 150 in Embodiment 1 estimates tag reader 200 installation error (θ, a, b) by simultaneous solution of equation 16, equation 17, and equation 18 on receiving variance pattern S from variance pattern analysis section 140. In contrast, on receiving variance pattern S from variance pattern analysis section 140, installation error estimating section 710 in Embodiment 2 first issues a request to convergence determination section 720 for narrowing down of calculation objects. Then installation error estimating section 710 estimates installation error (θ, a, b) based on the calculation objects narrowed down by convergence determination section 720.

As explained above, convergence determination section 720 selects an observation point that should be involved in installation error estimation based on reliability at the time of wireless tag 300 position detection, and estimates maximum-likelihood installation error allowing the error distribution of all selected observation points to be best approximated. Consequently, when requested by installation error estimating section 710 to narrow down calculation objects, convergence determination section 720 creates convergence determination information 730 shown in FIG. 22 and estimation results list 740 shown in FIG. 23, for example.

Convergence determination information 730 includes observation data information 731 including information used by convergence determination section 720 for convergence determination, and maximum-likelihood combination information 732 indicating a combination of observation points for which maximum-likelihood installation error allowing the error distribution of all selected observation points to be best approximated has been calculated. Observation data information 731 further includes tag ID 733, observation point name 734, observation point coordinates 735, and average reliability 736.

Estimation results list 740 comprises observation point combination 741 and installation error 742. Observation point combination 741 is a combination of observation points for which the simultaneous equations described in Embodiment 1 hold true, selected by convergence determination section 720. Installation error 742 is installation error resulting from solution of simultaneous equations by installation error estimating section 710 by means of an observation point combination.

In this embodiment, convergence determination section 720 estimates maximum-likelihood installation error using a least-squares method. Specifically, convergence determination section 720 calculates an error distance that is the square of the difference between a measured positioning distribution pattern of a determination observation point that is an observation point other than an observation point not involved in installation error estimation, and a value resulting from assigning estimated installation error to a predicted positioning distribution pattern. Next, convergence determination section 720 finds a total value resulting from adding together obtained error distances equal in number to the number of determination observation points, finds estimated installation error that minimizes this total value, and takes this to be maximum-likelihood installation error.

The actual processing performed by convergence determination section 720 will be described in detail later herein.

The operation of installation error estimating apparatus 700 having the above configuration will now be described using FIG. 24.

Here, a case will be described by way of example in which wireless tag 300 positioning is performed at five places, and installation error (θ, a, b) is estimated from the obtained observation data. The processing shown in FIG. 24 replaces step S1100 shown in FIG. 19 in Embodiment 1, and should be inserted between step S1090 and step S1110 shown in FIG. 19. That is to say, of the steps in the flowchart shown in FIG. 19, steps other than step S1100 are the same in this embodiment, and therefore a description of parts common to Embodiment 1 is omitted here.

Figure 19:
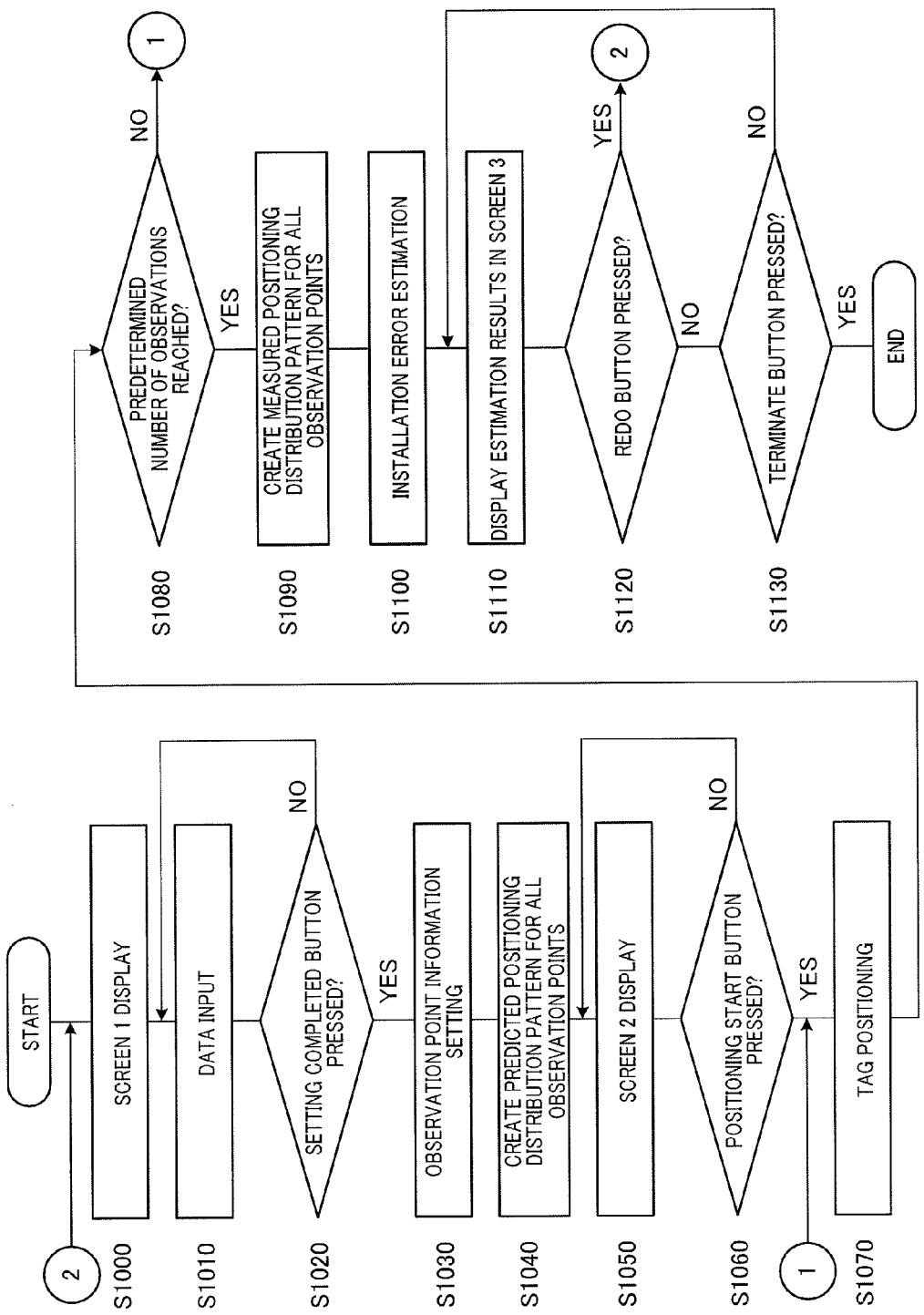
FIG. 19 is a flowchart showing the operation of an installation error estimating apparatus according to this embodiment.

At the stage of completion of step S1090 shown in FIG. 19, installation error estimating section 710 holds function f representing predicted positioning distribution pattern L, and variance pattern S, for each of five observation points (not shown).

Figure 24:
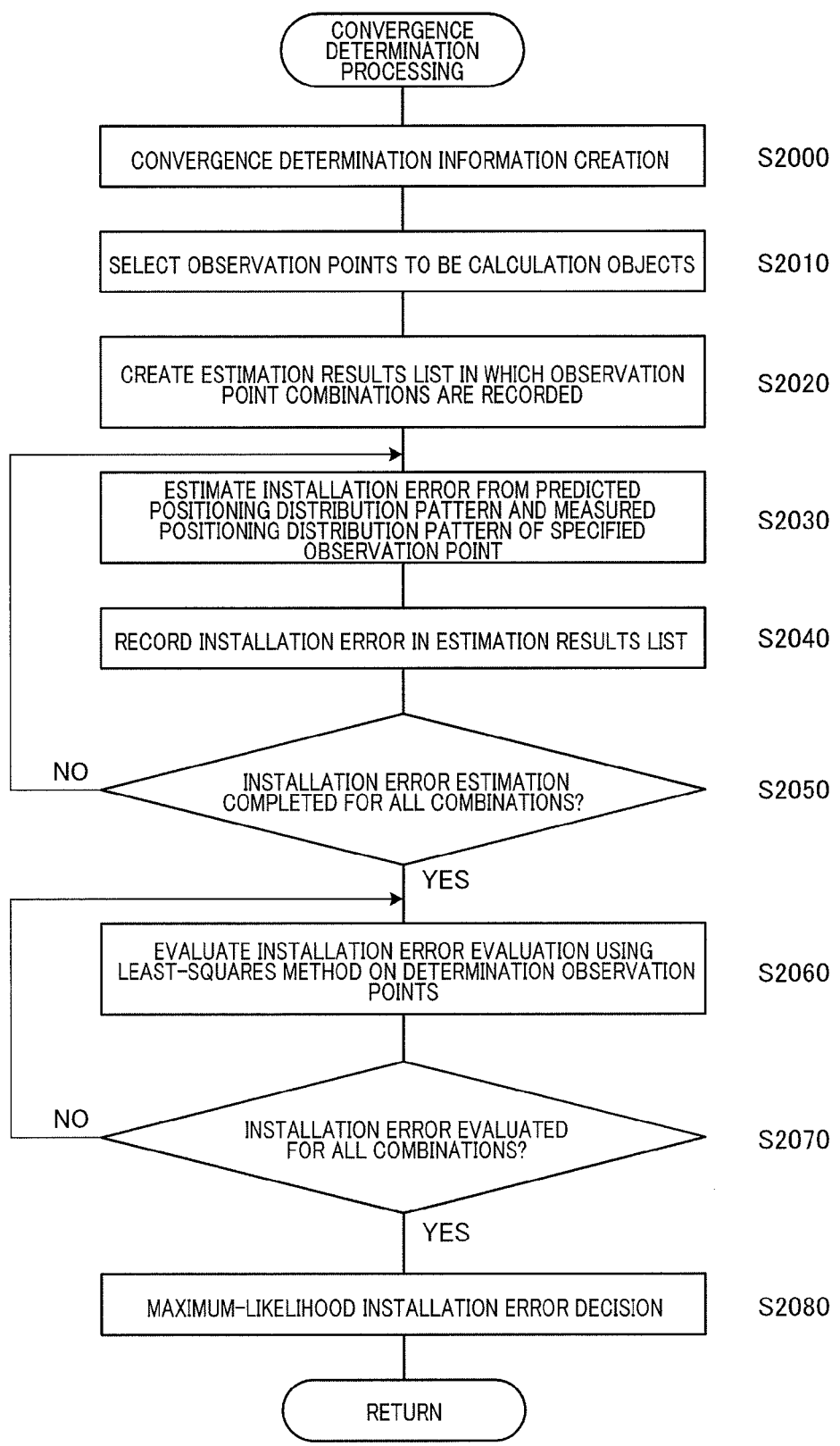
FIG. 24 is a flowchart showing the convergence determination processing procedure according to this embodiment.

Then, in step S2000 in FIG. 24, installation error estimating section 710 performs creation of convergence determination information 730 for selecting observation points that are to be calculation objects. Specifically, on receiving variance pattern S from variance pattern analysis section 140, installation error estimating section 710 issues a request to convergence determination section 720 for narrowing down of calculation objects. When requested to narrow down calculation objects by installation error estimating section 710, convergence determination section 720 creates convergence determination information 730 shown in FIG. 22.

The actual procedure is as follows, for example.

After first receiving a request to narrow down calculation objects from installation error estimating section 710, convergence determination section 720 next receives coordinate management tables 550 (all coordinate management tables for observation point 1 through observation point 5) shown in FIG. 5 from variance pattern analysis section 140. Then convergence determination section 720 copies tag IDs and observation point names of received coordinate management tables 550 to tag ID 733 and observation point name 734 respectively of convergence determination information 730. Also, convergence determination section 720 calculates the average of coordinate management tables 550 reliabilities, and records this in average reliability 736 of convergence determination information 730. For example, 3 points are assigned to reliability "A" and 2 points to reliability "B," averaging is performed, and if the average is 2.5 points or above, an average reliability of "A" is assigned.

Next, convergence determination section 720 receives observation point information 500 shown in FIG. 5 from predicted pattern calculation section 120. Then convergence determination section 720 extracts observation point coordinates from an observation point information 500 line for which observation point name 734 of convergence determination information 730 and observation point name 503 of observation point information 500 match, and records these in observation point coordinates 735 of convergence determination information 730.

In Embodiment 2, as in Embodiment 1, for convenience of explanation, a z-coordinate is omitted and a description is given in terms of two-dimensional coordinates.

Then, in step S2010, convergence determination section 720 performs selection of observation points that are to be calculation objects. Specifically, convergence determination section 720 extracts an observation point that is to be a calculation object by holding a selection criterion internally, and comparing average reliability 736 of convergence determination information 730 with that selection criterion. For example, in the example shown in FIG. 22, if the selection criterion is "average reliability is to be A," convergence determination section 720 compares average reliability 736 of convergence determination information 730 with that selection criterion. Through this comparison, convergence determination section 720 selects observation point 1 through observation point 4 as observation points that are to be calculation objects, and excludes observation point 5.

Then, in step S2020, convergence determination section 720 performs creation of estimation results list 740 in which observation point combinations are recorded. Specifically, convergence determination section 720 finds an observation point combination for performing installation error estimation from observation points selected in step S2010, and records an obtained observation point combination in observation point combination 741 of estimation results list 740. For example, if four observation points are selected in step S2010, the number of combinations is four ($_4C_3=4$). Of the four combinations, FIG. 23 illustrates only combination 1 comprising observation point 1, observation point 2, and observation point 3, and combination 2 comprising observation point 1, observation point 2, and observation point 4. Convergence determination section 720 requests installation error estimating section 710 to perform installation error estimation for each of the observation point combinations recorded in observation point combination 741.

Then, in step S2030, installation error estimating section 710 receives a request from convergence determination section 720, and performs installation error estimation for each observation point combination. Specifically, installation error estimating section 710 estimates installation error (θ, a, b) from a predicted positioning distribution pattern and measured positioning distribution pattern of a specified observation point for each observation point combination recorded in step S2020. The actual estimation method is similar to the method described in Embodiment 1, and therefore a description thereof will be omitted here. Installation error estimating section 710 passes estimated installation error to convergence determination section 720.

Then, in step S2040, convergence determination section 720 performs recording of installation error in estimation results list 740. Specifically, convergence determination section 720 receives installation error (θ, a, b) estimated in step S2030 from installation error estimating section 710, and records received installation error at the corresponding combination location in installation error column 742.

Then, in step S2050, convergence determination section 720 determines whether or not installation error estimation has been completed for all the combinations—that is, whether or not recording in estimation results list 740 has been completed. If the result of this determination is that installation error estimation has been completed for all the combinations (that is, recording in estimation results list 740 has been completed) (S2050: YES), convergence determination section 720 proceeds to step S2060. On the other hand, if installation error estimation has not been completed for all the combinations (that is, recording in estimation results list 740 has not been completed) (S2050: NO), convergence determination section 720 returns to step S2030, and performs installation error estimation for an unprocessed combination.

For example, in the example shown in FIG. 22, when installation error estimation has been completed, and recording in estimation results list 740 has been completed, for all the combinations, four sets of estimated installation error are present.

In step S2060, convergence determination section 720 performs evaluation of estimated installation error. Specifically, convergence determination section 720 applies installation error estimated by installation error estimating section 710 in step S2030 to an observation point (hereinafter referred to as "determination observation point") other than an observation point relating to simultaneous equations, and performs evaluation of this case. Installation error evaluation is performed using a least-squares method on determination observation points, for example.

More specifically, in the example shown in FIG. 22 and FIG. 23, a determination observation point of combination 1 (observation point 1, observation point 2, and observation point 3) is only observation point 4, and a determination observation point of combination 2 (observation point 1, observation point 2, and observation point 4) is only observation point 3. The same principle also applies to the other combinations.

At this time, convergence determination section 720 finds, for each combination, installation error that minimizes the sum of error distances $D_k^2$ (hereinafter referred to as "total value") defined by equation 20 below for determination observation point k (one or more) of that combination. Error distance $D_k^2$ is defined as the square of the difference between measured positioning distribution pattern $S_k$ and values substituted for installation error (θ, a, b) estimated by function $f_k$ representing predicted positioning distribution pattern L ($|S_k - f_k|^2$).

[20]

$$\Sigma D_k^2 = \Sigma |S_k - f_k|^2 \qquad \text{(Equation 20)}$$

For example, to describe a case in which a determination observation point is observation point 3, the following applies to error distance $D_k^2$. When a determination observation point is observation point 3, error distance $D_3^2$ can be represented by equation 21 below using values substituted for installation error ($\theta_{(2)}$, $a_{(2)}$, $b_{(2)}$) estimated from positioning results of combination 2 (observation points 1, 2, and 4) in equation 18. In the example shown in FIG. 22 and FIG. 23, there is only one determination observation point for each combination. Consequently, in the final analysis, installation error ($\theta_{(2)}$, $a_{(2)}$, $b_{(2)}$) estimated from positioning results of combination 2 (observation point 1, observation point 2, and observation point 4) is evaluated using this equation 21.

[21]

$$D_3^2 = |S_3 - 2 \cdot r_3 \tan\alpha \cdot \cos T_3|^2 \qquad \text{(Equation 21)}$$

$$\text{where } \cos\beta_3 = \frac{r + b_{(2)}}{\sqrt{a_{(2)}^2 + (r + b_{(2)})^2}}$$

$$r_3 = \sqrt{a_{(2)}^2 + (b_{(2)} + r)^2}$$

$$T_3 = \beta_3 + \theta_{(2)}$$

Then, in step S2070, convergence determination section 720 determines whether or not installation error has been evaluated for all the combinations. If the result of this determination is that installation error has been evaluated for all the combinations (S2070: YES), convergence determination section 720 proceeds to step S2080. On the other hand, if installation error has not been evaluated for all the combinations (S2070: NO), convergence determination section 720 returns to step S2060, and performs installation error evaluation for a remaining combination.

In step S2080, convergence determination section 720 performs a maximum-likelihood installation error decision. Specifically, convergence determination section 720 uses step S2060 evaluation results (that is, a total value represented by equation 20) to find a combination that minimizes the total value, and finds installation error (θ, a, b) estimated in this combination. This installation error (θ, a, b) is installation error that minimizes the total value (the sum of error distances $D_k^2$), and is "maximum-likelihood installation error." The obtained maximum-likelihood installation error is passed to installation error output section 160.

For example, in the example shown in FIG. 22 and FIG. 23, it is assumed that evaluation has been performed on installation error estimated for all combinations, using an expression such as represented by equation 22, and the relationship shown in equation 22 below has been obtained.

[22]

$$D_3^2 \le D_1^2 \le D_2^2 \le D_4^2 \qquad \text{(Equation 22)}$$

At this time, the minimum total value (error distance $D_k^2$) is error distance $D_3^2$ using installation error ($\theta_{(2)}$, $a_{(2)}$, $b_{(2)}$) estimated from the positioning results of combination 2 (observation point 1, observation point 2, and observation point 4). Therefore, in this example, installation error ($a_{(2)}$, $b_{(2)}$, $\theta_{(2)}$) in combination 2 corresponding to error distance $D_3^2$ is decided upon as maximum-likelihood installation error.

Installation error estimating apparatus 700 operation then proceeds to step S1110 shown in FIG. 19. In this embodiment, convergence determination section 720 estimates maximum-likelihood installation error, and passes the estimated maximum-likelihood installation error to installation error output section 160. Consequently, installation error output section 160 displays this maximum-likelihood installation error in operation screen 570 (screen 3) shown in FIG. 12.

Therefore, according to this embodiment, since convergence determination section 720 is provided and performs evaluation of estimated installation error, the same kind of effect can be obtained as in Embodiment 1 even in an environment in which communication conditions are not necessarily good.

Also, in the installation of tag reader 200 and wireless tags 300, there is a possibility of error being included not only in the tag reader 200 installation position, but also in the wireless tag 300 installation positions. If an observation point for which wireless tag 300 installation position error is large is included in an observation point combination, error distance Dk2 increases due to the application of installation error estimated from positioning results of that combination to a determination convergence point. It is thus possible to exclude the possibility of an observation point with large wireless tag 300 installation position error being included in installation error estimation.

In this embodiment, a least-squares method is applied to determination observation points when estimating maximum-likelihood installation error, but the present invention is not limited to this. For example, averaging of installation error of each combination may also be used in maximum-likelihood installation error estimation.

Embodiment 3

Embodiment 3 is a case in which, in addition to the provisions of Embodiment 1, a position for newly placing a wireless tag as an observation object is further recommended if estimated installation error does not satisfy a convergence condition.

This embodiment will now be described using FIG. 25 through FIG. 28.

Figure 25:
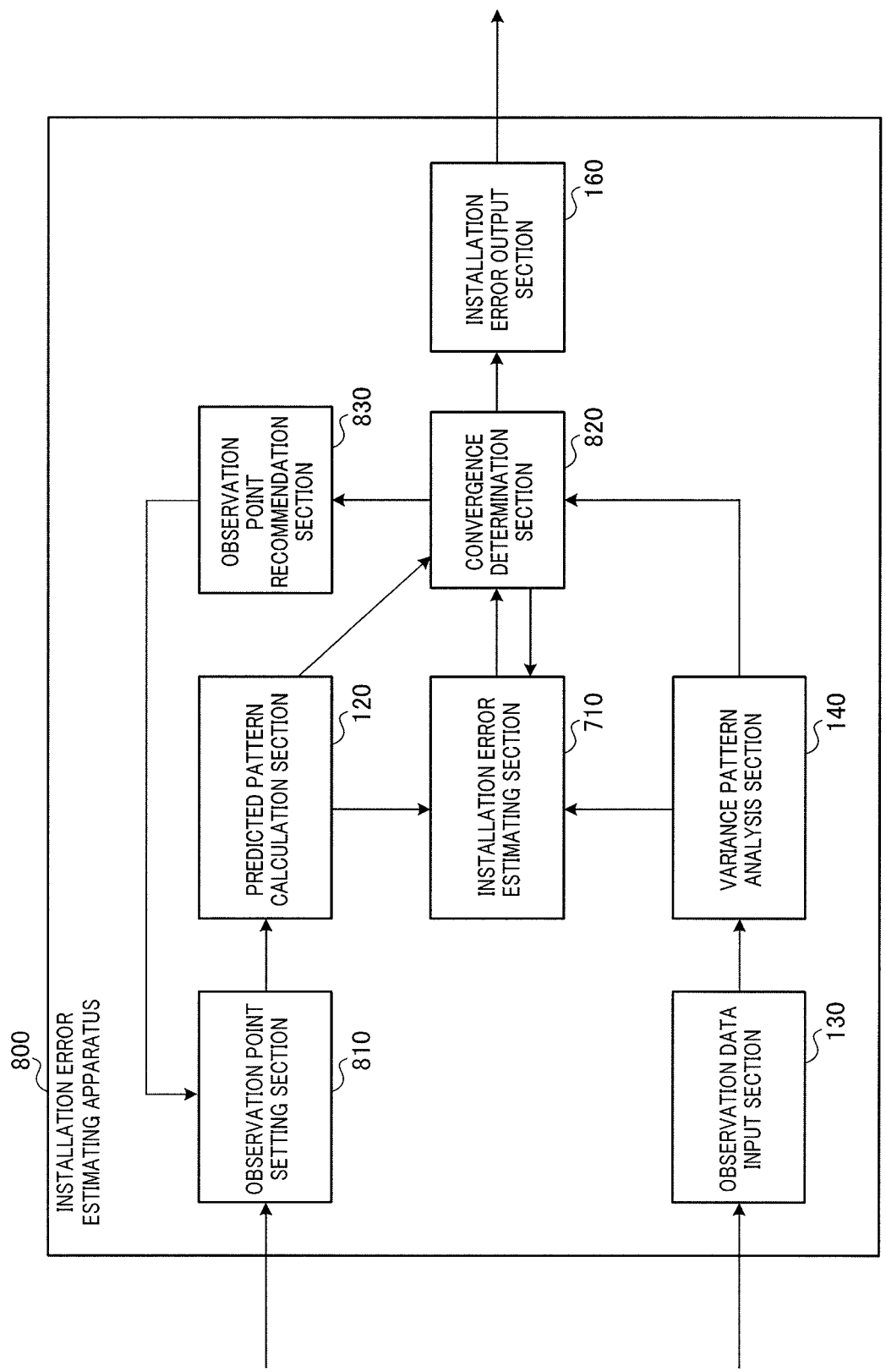
FIG. 25 is a block diagram showing the configuration of an installation error estimating apparatus according to Embodiment 3 of the present invention.

FIG. 25 is a block diagram showing the configuration of an installation error estimating apparatus according to Embodiment 3 of the present invention. This installation error estimating apparatus 800 has a similar basic configuration to installation error estimating apparatus 100 corresponding to Embodiment 1 shown in FIG. 4 and installation error estimating apparatus 700 corresponding to Embodiment 2 shown in FIG. 21. Configuration elements in FIG. 25 identical to those in FIG. 4 and FIG. 21 are assigned the same reference codes as in FIG. 4 and FIG. 21, and descriptions thereof are omitted here.

Installation error estimating apparatus 800 shown in FIG. 25 has observation point recommendation section 830 in addition to the configuration of Embodiment 2.

The following description centers in detail upon observation point recommendation section 830, which is the main area of difference between installation error estimating apparatus 700 according to Embodiment 2 shown in FIG. 21 and installation error estimating apparatus 800 according to this embodiment shown in FIG. 25.

In Embodiment 2, a mode was described in which installation error approximating with the highest degree of precision a predicted positioning distribution pattern and measured positioning distribution pattern of observation data from among an estimated plurality of installation errors is decided upon as maximum-likelihood installation error.

In contrast, in this embodiment, a mode is described in which a threshold value is provided for precision of approximation, and wireless tag 300 is newly positioned, and installation error estimation is repeated, until high precision greater than or equal to the threshold value is attained.

More particularly, a characteristic of installation error estimating apparatus 800 according to this embodiment is that observation point recommendation section 830 decides a position of an observation point to be added, and observation point setting section 810 reports to the user that wireless tag 300 re-installation and re-measurement should be carried out.

Convergence determination section 820 has the following functions in addition to the same kind of function as convergence determination section 720 in Embodiment 2. Namely, convergence determination section 820 has a function of holding threshold value T internally, and comparing a value obtained by dividing a total value for which distance error is minimal by the number of determination observation points with threshold value T in all current combinations, and also a function of determining whether or not distance error variance V satisfies a threshold value condition.

Convergence determination section 820 determines that the threshold value condition is satisfied if distance error variance V is less than or equal to threshold value T (V≤T), and determines that the threshold value condition is not satisfied if distance error variance V is greater than threshold value T (V>T). In the event of determining that the threshold value condition is not satisfied, convergence determination section 820 passes convergence determination information 730 shown in FIG. 22 and installation error corresponding to the minimum distance error total value (maximum-likelihood installation error in Embodiment 2) to observation point recommendation section 830.

For example, in Embodiment 2, if variance V of distance error calculated from error distance $D_3^2$ that is minimal in equation 22 is greater than threshold value T (T<$D_3^2$), convergence determination section 820 determines that distance error variance V does not satisfy the threshold value condition. In this case, distance error variance V matches error distance $D_3^2$ since the number of determination observation points is one. Then convergence determination section 820 passes current convergence determination information 730 and installation error ($a_{(2)}$, $b_{(2)}$, $\theta_{(2)}$) corresponding to distance error variance V to observation point recommendation section 830 according to the determination.

On receiving convergence determination information 730 from convergence determination section 820, observation point recommendation section 830 decides an observation point at which wireless tag 300 is to be newly placed and undergo positioning, and passes the coordinates of the decided observation point to observation point setting section 810. The actual processing performed by observation point recommendation section 830 will be described in detail later herein.

Figure 26:
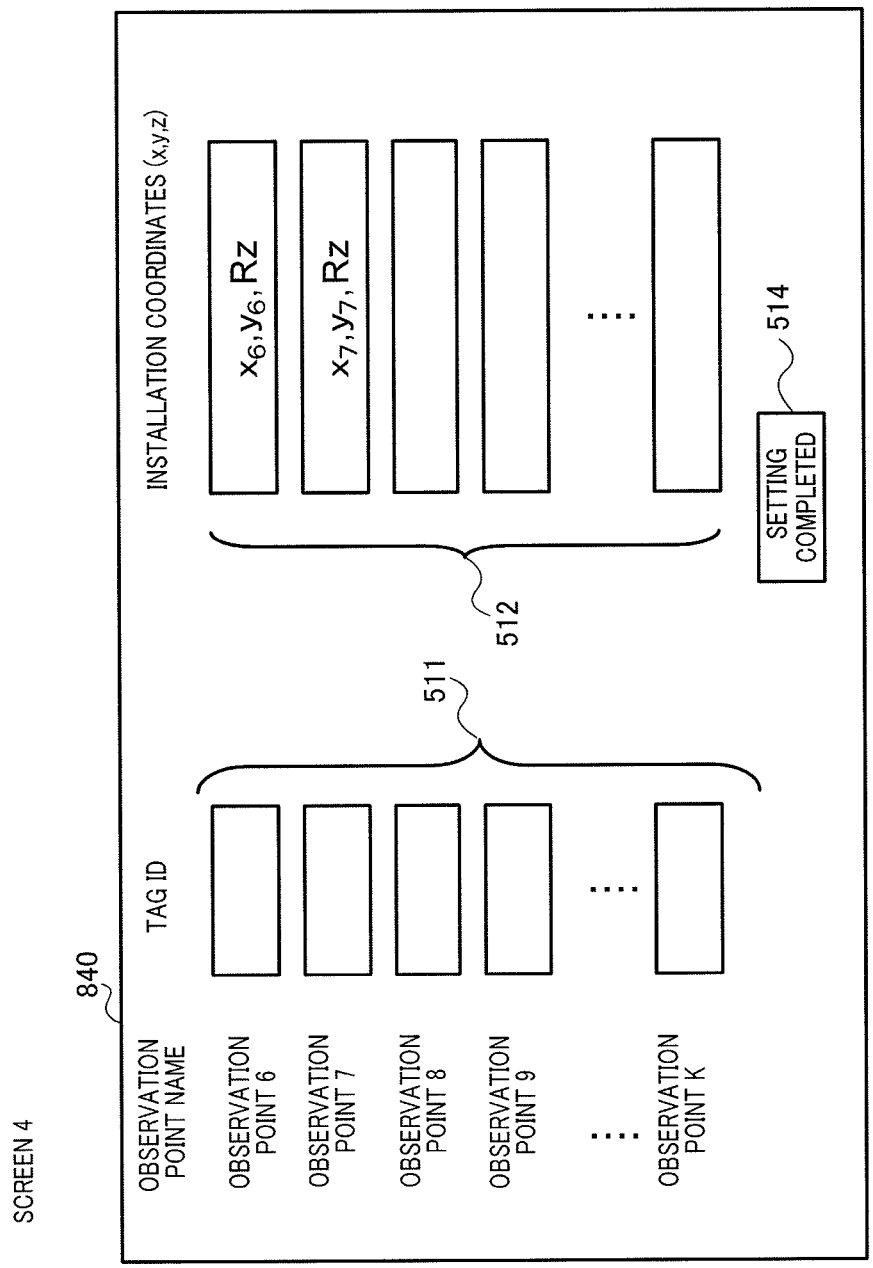
FIG. 26 is a drawing showing an example of an operation screen display in which installation coordinates of a recommended additional observation point are input in this embodiment.

Observation point setting section 810 has the following functions in addition to the same kind of function as observation point setting section 110 in Embodiment 1 and Embodiment 2. Namely, observation point setting section 810 differs from observation point setting section 110 in receiving new observation point coordinates from observation point recommendation section 830, and in displaying a predetermined operation screen for reporting to the user those new observation point coordinates after they have been received. The operation screen for reporting to the user observation point recommendation section 830 output (added new observation point coordinates) has, for example, the same kind of screen configuration as screen 1 shown in FIG. 6, as shown in FIG. 26. The operation screen is a screen in which received observation point coordinates are input in observation point coordinate input column 512.

FIG. 26 shows a screen when observation point recommendation section 830 has decided upon the addition of two observation points, and recommends installation and positioning of wireless tags 300 at ($x_6$, $y_6$, $R_z$) and ($x_7$, $y_7$, $R_z$).

Next, the method whereby observation point recommendation section 830 decides an additional observation point for newly placing and positioning wireless tag 300 will first be outlined.

Observation point recommendation section 830 decides a new observation point based on predetermined decision rules. The decision rules are held by observation point recommendation section 830, and are defined as shown below, for example.

Rule 1: The reliability of a nearby observation point should be high.

Rule 2: The distance from another observation point should be a fixed distance or more.

Rule 3: An additional observation point should be on a circle concentric with, or on the same radius as, an observation point with high reliability in an estimated local coordinate system.

Here, the basis for rule 1 is that "the probability of good communication conditions is high in the vicinity of an observation point with high reliability"; rule 2 is based on "achieving approximation in the entire positioning area rather than local approximation"; and the basis for rule 3 is that, when calculating a measured positioning distribution pattern base on the following three bases, an improvement in calculation precision can be expected by comparing reliabilities mutually. A basis for rule 3 is, first, that observation points present on concentric circles in a local coordinate system have a high probability of having the same variance pattern. A basis for rule 3 is, secondly, that observation points on the same radius have a high probability of being in clear view of a tag reader, and being close in terms of communication environment, such as the effects of reflected waves. Thirdly, a basis for rule 3 is that, due to the characteristic whereby "a measurement result distribution extends in an arc of angle error a on a spherical surface with line segments linking a tag reader to wireless tags as radius r," as illustrated by FIG. 13, the same angle error $\alpha$ can be expected.

Observation point recommendation section 830 decides upon a point that satisfies all of rules 1 through 3 as a new observation point.

However, the greater the number of new observation points, the higher is the cost of installation work for wireless tags 300, and the higher is the calculation cost due to an increase in the number of combinations of observation points for which installation error estimation is performed, making it desirable for the number of new observation points to be kept within limits.

Figure 27:
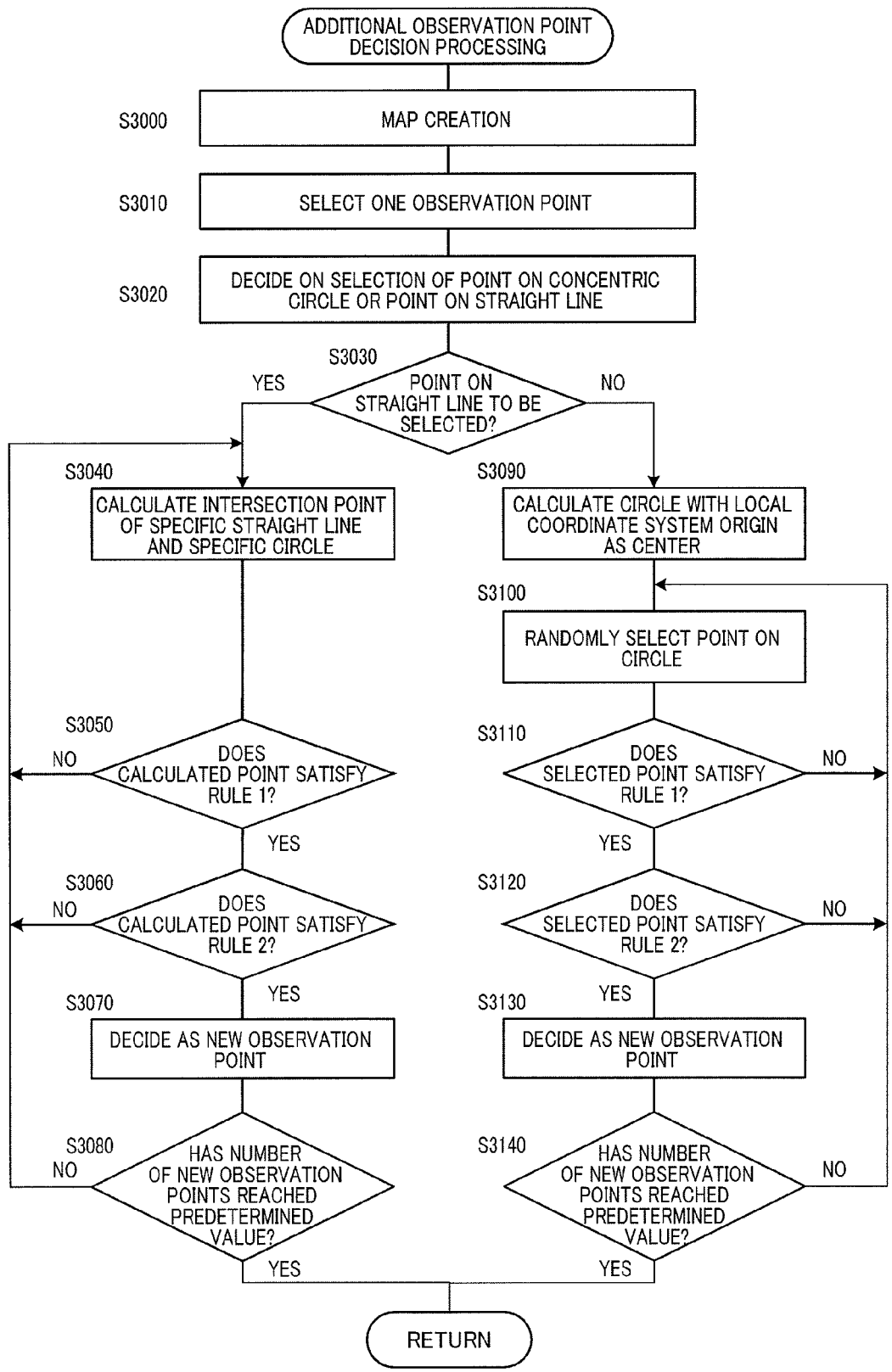
FIG. 27 is a flowchart showing the additional observation point decision processing procedure in this embodiment.

The processing procedure up to a decision on a new observation point by observation point recommendation section 830 will now be described using FIG. 27 and FIG. 28. FIG. 27 is a flowchart showing additional observation point decision processing, and FIG. 28 shows conceptual diagrams explaining the additional observation point decision method.

Here, a presupposition for the processing is that it has been decided beforehand that two new observation points are to be selected. It is also assumed that predetermined value d has been decided upon beforehand as the distance from another observation point in rule 2.

First, in step S3000, observation point recommendation section 830, on receiving convergence determination information 730 from convergence determination section 820, creates a map such as shown in FIG. 28A, for example, based on received convergence determination information 730. Although it is not actually necessary to draw the coordinate axes and circle represented by dotted lines, they are drawn here for convenience of explanation.

In FIG. 28, observation points are displayed by means of symbols that differ according to average reliability 736 of observation data information 731. For example, symbol "⊚" means that the reliability of most data is "A," with average reliability of 2.75 or above; symbol "○" means that reliability is registered as "A" on average although "B" is partially included, with average reliability of 2.5 or above and less than 2.75; and symbol "Δ" means that the reliability of most data is "B," with average reliability of 2.5 or below. Positions and observation point names on the map can be mutually associated using observation point name 734 and observation point coordinates 735 of observation data information 731.

Then, in step S3010, observation point recommendation section 830 performs observation point selection. Specifically, observation point recommendation section 830 selects one observation point from observation points for which average reliability is high. For example, based on rule 1, observation point recommendation section 830 selects one observation point from among observation point 1, observation point 2, and observation point 3, for which average reliability is high, and narrows down candidates to the vicinity of the selected observation point. Here, it is assumed that single observation point 3 has been randomly selected from the three observation points 1 through 3 to which the same average reliability has been assigned. In this case, the selected observation point may, of course, also be observation point 1 or observation point 2.

Then, in step S3020, observation point recommendation section 830 makes a selection decision for the rule 3 application criterion. Specifically, observation point recommendation section 830 decides whether to select a point present on a concentric circle or a point on a straight line linking a local coordinate origin to an existing observation point as a rule 3 application criterion. Here, a decision can be made on a case-by-case basis as to random or alternate selection of which point is to be prioritized and the like in accordance with rule 3.

Then, in step S3030, observation point recommendation section 830 determines whether or not selection of a point on a straight line has been decided in step S3020. If the result of this determination is that selection of a point on a straight line has been decided (S3030: YES), observation point recommendation section 830 proceeds to step S3040. On the other hand, if selection of a point on a straight line has not been decided—that is, if selection of a point on a concentric circle has been decided—(S3030: NO), observation point recommendation section 830 proceeds to step S3090.

Step S3040 through step S3080 show processing when (1) it has been decided to prioritize a point on a straight line linking a local coordinate origin to an already observed existing observation point as a result of the determination in step S3030. Step S3090 through step S3140 show processing when (2) it has been decided to prioritize a point on a concentric circle as a result of the determination in step S3030. Each of these cases is described below.

(1) When it has been decided to prioritize a point on a straight line linking a local coordinate origin to an already observed existing observation point In step S3040, observation point recommendation section 830 calculates an intersection point of a straight line linking a currently selected observation point to a local coordinate origin, and a circle with a local coordinate system origin as its center and for which the distance from a currently selected observation point is predetermined value d.

A specific example will now be described, referring to FIG. 22 and FIG. 23. From installation error $(a_{(2)}, b_{(2)}, \theta_{(2)})$ corresponding to minimal error distance $D_3^2$, observation point recommendation section 830 represents the relationship between local coordinates (X, Y) and virtual global coordinates (x, y) by means of equation 23 and equation 24 below, where equation 24 is derived from equation 23.

[23]
$$\begin{pmatrix} X \\ Y \end{pmatrix} = \begin{pmatrix} \cos\theta & \sin\theta \\ -\sin\theta & \cos\theta \end{pmatrix} \begin{pmatrix} x-a \\ y-b \end{pmatrix} \quad \text{(Equation 23)}$$

[24]
$$\begin{pmatrix} x \\ y \end{pmatrix} = \begin{pmatrix} \cos\theta & -\sin\theta \\ \sin\theta & \cos\theta \end{pmatrix} \begin{pmatrix} X \\ Y \end{pmatrix} + \begin{pmatrix} a \\ b \end{pmatrix} \quad \text{(Equation 24)}$$

Next, observation point recommendation section 830 converts the respective observation point coordinates to global coordinates using an estimated transformation matrix (see equation 24).

Since the coordinates of observation point 3 in the virtual global coordinate system are known to be $(x_3, y_3)$ from observation point coordinates 735 of convergence determination information 730, coordinates $(X_3, Y_3)$ of observation point 3 in the local coordinate system can be obtained by substitution in equation 23.

To be precise, $(x_3, y_3)$ are coordinates in a global coordinate system, and the parallel translation relationship represented by equation 6 and equation 7 applies between a global coordinate system and a virtual global coordinate system. However, in this embodiment, the two are treated as the same for convenience of explanation.

Therefore, additional observation point 6 $(X_6, Y_6)$ is a point of intersection of straight line 841 and circle 842 (see FIG. 28B). Straight line 841 is a straight line represented by equation 25 below, linking local coordinate origin 840 and observation point 3. Circle 842 is a circle represented by equation 26 below, with local coordinate system origin 840 as its center and for which the distance from observation point 3 is predetermined value d.

[25]
$$Y = \frac{Y_3}{X_3} X \quad \text{(Equation 25)}$$

[26]
$$X^2 + Y^2 = \left(\sqrt{X_3^2 + Y_3^2} - d\right)^2 \quad \text{(Equation 26)}$$

Therefore, virtual global coordinates $(x_6, y_6)$ of additional observation point 6 are obtained by substitution in equation 24, which is an inverse transform of equation 23.

Then, in step S3050, observation point recommendation section 830 determines whether or not the point calculated in step S3040 (additional observation point 6) satisfies rule 1. If the result of this determination is that the calculated point (additional observation point 6) satisfies rule 1 (S3050: YES), observation point recommendation section 830 proceeds to step S3060. On the other hand, if the calculated point (additional observation point 6) does not satisfy rule 1 (S3050: NO), observation point recommendation section 830 returns to step S3040.

Also, in step S3060, observation point recommendation section 830 determines whether or not the point calculated in step S3040 (additional observation point 6) satisfies rule 2. If the result of this determination is that the calculated point (additional observation point 6) satisfies rule 2 (S3060: YES), observation point recommendation section 830 proceeds to step S3070. On the other hand, if the calculated point (additional observation point 6) does not satisfy rule 2 (S3060: NO), observation point recommendation section 830 returns to step S3040.

In step S3070, observation point recommendation section 830 decides upon the point calculated in step S3040 (additional observation point 6) as a new observation point (additional observation point). Also, observation point recommendation section 830 updates the currently selected observation point to the additional observation point. For example, since additional observation point 6 satisfies rule 1 and rule 2, additional observation point 6 is decided upon as a new observation point (additional observation point).

Then, in step S3080, observation point recommendation section 830 determines whether or not the number of additional observation points has reached a predetermined value (here, two). If the result of this determination is that the number of additional observation points has reached the predetermined value (S3080: YES), observation point recommendation section 830 terminates the series of processing steps. On the other hand, if the number of additional observation points has not reached the predetermined value (S3080: NO), observation point recommendation section 830 returns to step S3040. Then observation point recommendation section 830 finds additional observation point 7 $(x_7, y_7)$ by means of the same kind of procedure, for example.

Step S3040 through step S3080 are repeated in this way until the number of new observation points reaches the predetermined value.

(2) When it has been decided to prioritize a point on a concentric circle

On the other hand, in step S3090, observation point recommendation section 830 calculates a circle with a local coordinate system origin as its center and for which the distance from a currently selected observation point is predetermined value d. For example, observation point recommendation section 830 calculates circle 842 with local coordinate system origin 840 as its center and for which the distance from observation point 3 is predetermined value d (see FIG. 28C). This circle 842 is represented by equation 26.

Then, in step S3100, observation point recommendation section 830 randomly selects a point on the circle calculated in step S3090. For example, observation point recommendation section 830 selects additional observation point 6 $(X_6, Y_6)$ that satisfies equation 26.

Specifically, for example, as described above, provision can be made for a point of intersection of straight line 841 represented by equation 25 and circle 842 represented by equation 26 to be calculated, and for this point of intersection to be selected as first additional observation point candidate $(X_6, Y_6)$. As explained above, straight line 841 represented by equation 25 is a straight line linking the currently selected observation point (observation point 3) to local coordinate origin 840, and circle 842 represented by equation 26 is a circle with local coordinate system origin 840 as its center and for which the distance from the currently selected observation point (observation point 3) is predetermined value d.

Then, in step S3110, observation point recommendation section 830 determines whether or not the point calculated in step S3100 (additional observation point 6) satisfies rule 1. Specifically, for example, observation point recommendation section 830 determines whether virtual global coordinates $(x_6, y_6)$ of additional observation point 6 obtained by adding $(X_6, Y_6)$ to equation 24 satisfy rule 1. If the result of this determination is that the calculated point (additional observation point 6) satisfies rule 1 (S3110: YES), observation point recommendation section 830 proceeds to step S3120. On the other hand, if the calculated point (additional observation point 6) does not satisfy rule 1 (S3110: NO), observation point recommendation section 830 returns to step S3100.

Also, in step S3120, observation point recommendation section 830 determines whether or not the point calculated in step S3100 (additional observation point 6) satisfies rule 2. Specifically, for example, observation point recommendation section 830 determines whether virtual global coordinates ($x_6$, $y_6$) of additional observation point 6 obtained by adding ($X_6$, $Y_6$) to equation 24 satisfy rule 2. If the result of this determination is that the calculated point (additional observation point 6) satisfies rule 2 (S3120: YES), observation point recommendation section 830 proceeds to step S3130.

On the other hand, if the calculated point (additional observation point 6) does not satisfy rule 2 (S3120: NO), observation point recommendation section 830 returns to step S3100.

In step S3130, observation point recommendation section 830 decides upon the point calculated in step S3100 (additional observation point 6) as a new observation point (additional observation point). Also, observation point recommendation section 830 updates the currently selected observation point to the additional observation point. For example, since additional observation point 6 satisfies rule 1 and rule 2, additional observation point 6 is decided upon as a new observation point (additional observation point).

Then, in step S3140, observation point recommendation section 830 determines whether or not the number of additional observation points has reached a predetermined value (here, two). If the result of this determination is that the number of additional observation points has reached the predetermined value (S3140: YES), observation point recommendation section 830 terminates the series of processing steps. On the other hand, if the number of additional observation points has not reached the predetermined value (S3140: NO), observation point recommendation section 830 returns to step S3100. At this time, local coordinates of additional observation point 7 can be decided, for example, as point ($X_7$, $Y_7$) obtained by rotating additional observation point 6 through previously decided angle β in the local coordinate system.

Step S3100 through step S3140 are repeated in this way until the number of new observation points reaches the predetermined value.

The two additional observation points ($X_6$, $Y_6$, $R_z$) and ($X_7$, $Y_7$, $R_z$) decided by observation point recommendation section 830 in this way are passed to observation point setting section 810. On receiving the new observation point coordinates from observation point recommendation section 830, observation point setting section 810 displays operation screen 840 (screen 4) in which the received observation point coordinates are input in observation point coordinate input column 512 (see FIG. 26). As described above, FIG. 26 recommends installation and positioning of wireless tags 300 at two additional observation points ($x_6$, $y_6$, $R_z$) and ($x_7$, $y_7$, $R_z$).

The user then inputs the tag IDs of wireless tags 300 to be installed at the additional observation points in tag ID input column 511. After the user has installed wireless tags 300 at the additional observation points, positioning is started for the two wireless tags 300 installed at the additional observation points by depression of setting completed button 514 by the user.

Thus, according to this embodiment, in addition to provision of the effects of Embodiment 1 and Embodiment 2, a threshold value is provided for precision of approximation, and wireless tag 300 is newly positioned, and installation error estimation is repeated, until high precision greater than or equal to the threshold value is attained. Consequently, this embodiment enables the number of times re-measurement and re-installation are performed until a threshold value is met to be reduced.

More particularly, according to this embodiment, when observation point recommendation section 830 decides a position of an observation point to be added, observation point recommendation section 830 considers variation in observation points, observation point communication conditions, selection of observation points for which there is a high probability of obtaining the same kind of positioning distribution, and so forth. Consequently, this embodiment makes it all the more possible to achieve high-precision positioning with simple installation, irrespective of observation point installation conditions or communication conditions.

The disclosure of Japanese Patent Application No. 2008-302492, filed on Nov. 27, 2008, including the specification, drawings and abstract, is incorporated herein by reference in its entirety.

INDUSTRIAL APPLICABILITY

An installation error estimating apparatus and installation error estimating method of the present invention are suitable for use as an installation error estimating apparatus and installation error estimating method capable of enabling error-free, high-precision positioning to be achieved with simple installation, and can be effectively applied to installation support for an apparatus having an antenna, for example.

REFERENCE SIGNS LIST 100, 700, 800 Installation error estimating apparatus
110, 810 Observation point setting section
120 Predicted pattern calculation section
130 Observation data input section
140 Variance pattern analysis section
150, 710 Installation error estimating section
160 Installation error output section
200 Tag reader
300, 300a, 300b, 300c Wireless tag
500 Observation point information
510 Operation screen (screen 1)
520 Observation data
530 Operation screen (screen 2)
540, 541 Log
550, 551, 552, 553 Coordinate management table
560 Measured positioning distribution pattern list
570 Operation screen (screen 3)
720, 820 Convergence determination section
730 Convergence determination information
740 Estimation results list
830 Observation point recommendation section
840 Operation screen (screen 4)

The invention claimed is:

1. An installation error estimating apparatus that estimates an installation error of a tag reader that positions a wireless tag, the installation error estimating apparatus comprising:
a central processing unit that executes instructions stored in a memory;
wherein the central processing unit comprises;
a predicted pattern acquirer that acquires, for each observation point where the wireless tag is installed and positioned, a predicted positioning distribution pattern, which is obtained by calculating a characteristic pattern of a predicted positioning distribution obtained by predicting a positioning distribution, the positioning distribution representing a distribution of a plurality of positioning results of the observation point;

an observation data inputter to which the plurality of positioning results of the tag reader with respect to the wireless tag is input as observation data;

a variance pattern analyzer that calculates, as a measured positioning distribution pattern, a characteristic pattern of a measured positioning distribution, which is obtained by statistical analysis of the plurality of positioning results, for each observation point, based on the observation data input by the observation data inputter; and an installation error estimator that calculates an installation error of the tag reader, the installation error representing at least one of an orientation deviation of the tag reader and a position deviation of the tag reader, using the predicted positioning distribution pattern acquired by the predicted pattern acquirer and the measured positioning distribution pattern calculated by the variance pattern analyzer, wherein the predicted pattern acquirer comprises:

an observation point information setter that sets information relating to the observation point as observation point information; and a predicted pattern calculator that calculates, as the predicted positioning distribution pattern, the characteristic pattern of the predicted positioning distribution obtained by predicting the positioning distribution, for each observation point, based on the observation point information set by the observation point information setter, wherein the predicted pattern calculator calculates, for each observation point, the predicted positioning distribution pattern using a distribution obtained by projecting the predicted positioning distribution in a predetermined tangential direction at the observation point on a spherical surface having a line segment linking an installation position of the tag reader to the observation point as a radius; and the variance pattern analyzer calculates the measured positioning distribution pattern using a distribution obtained by projecting the measured positioning distribution in the tangential direction for each observation point.

2. The installation error estimating apparatus according to claim 1, further comprising a convergence determiner that selects observation points that are involved in estimation of the installation error of the tag reader based on a positioning reliability of wireless tags, and calculates a maximum-likelihood installation error allowing an error distribution of all of the selected observation points to be best approximated.

3. The installation error estimating apparatus according to claim 2, wherein the convergence determiner:

selects the observation points that are involved in estimation of the installation error of the tag reader based on the positioning reliability of the wireless tags, and takes all of the selected observation points as objects;

calculates an error distance that is a square of a difference between the measured positioning distribution pattern and a value resulting from substituting the estimated installation error in the predicted positioning distribution pattern at a determination observation point that is an observation point other than an observation point that is not involved in estimation of the installation error of the tag reader, for each estimated installation error calculated by the installation error estimator;

calculates a total value resulting from adding obtained error distances equal in number to a number of the determination observation points; and finds the estimated installation error that minimizes the obtained total value, and takes the found estimated installation error to be the maximum-likelihood installation error.

4. The installation error estimating apparatus according to claim 2, further comprising an observation point recommender that, when the maximum-likelihood installation error calculated by the convergence determiner does not satisfy a predetermined convergence condition, calculates an additional observation point recommended for newly installing and positioning the wireless tag, based on a predetermined decision rule.

5. The installation error estimating apparatus according to claim 4, wherein the convergence determiner, when a value obtained by dividing a total value corresponding to the calculated maximum-likelihood installation error by a number of determination observation points is greater than or equal to a threshold value, determines that the calculated maximum-likelihood installation error does not satisfy the predetermined convergence condition.

6. The installation error estimating apparatus according to claim 4, wherein the observation point recommender holds four rules as the decision rules, the four rules comprising that a reliability of a nearby observation point is greater than or equal to a predetermined threshold value, that a distance from another observation point is greater than or equal to a predetermined threshold value, that the additional observation point is on a concentric circle in a coordinate system defined by the tag reader, and that the additional observation point is on a same radius in a coordinate system defined by the tag reader, and decides upon a point that satisfies at least one of the four rules as the additional observation point.

7. An installation error estimating apparatus that estimates an installation error of a tag reader that positions a wireless tag, the installation error estimating apparatus comprising:

a central processing unit that executes instructions stored in a memory;

wherein the central processing unit comprises;

a predicted pattern acquirer that acquires, for each observation point where the wireless tag is installed and positioned, a predicted positioning distribution pattern, which is obtained by calculating a characteristic pattern of a predicted positioning distribution obtained by predicting a positioning distribution, the positioning distribution representing a distribution of a plurality of positioning results of the observation point;

an observation data inputter to which the plurality of positioning results of the tag reader with respect to the wireless tag is input as observation data;

a variance pattern analyzer that calculates, as a measured positioning distribution pattern, a characteristic pattern of a measured positioning distribution, which is obtained by statistical analysis of the plurality of positioning results, for each observation point, based on the observation data input by the observation data inputter; and an installation error estimator that calculates an installation error of the tag reader, the installation error representing at least one of an orientation deviation of the tag reader and a position deviation of the tag reader, using the predicted positioning distribution pattern acquired by the predicted pattern acquirer and the measured positioning distribution pattern calculated by the variance pattern analyzer, wherein the predicted pattern acquirer comprises:
an observation point information setter that sets information relating to the observation point as observation point information; and
a predicted pattern calculator that calculates, as the predicted positioning distribution pattern, the characteristic pattern of the predicted positioning distribution obtained by predicting the positioning distribution, for each observation point, based on the observation point information set by the observation point information setter,
wherein the observation point is set on one of a first axis and a second axis defining a horizontal direction of a coordinate system defined by the tag reader;
the predicted pattern calculator, when the observation point has been set on the first axis, calculates the predicted positioning distribution pattern using a distribution obtained by projecting the predicted positioning distribution onto a straight line parallel to the second axis, or, when the observation point has been set on the second axis, calculates the predicted positioning distribution pattern using a distribution obtained by projecting the predicted positioning distribution onto a straight line parallel to the first axis; and
the variance pattern analyzer, when the observation point has been set on the first axis, calculates the measured positioning pattern using a distribution obtained by projecting the measured positioning distribution onto a straight line parallel to the second axis, or, when the observation point has been set on the second axis, calculates the measured positioning pattern using a distribution obtained by projecting the measured positioning distribution onto a straight line parallel to the first axis.

* * * * *